(12) United States Patent
Tonyan et al.

(10) Patent No.: US 8,061,257 B2
(45) Date of Patent: Nov. 22, 2011

(54) CEMENT BASED ARMOR PANEL SYSTEM

(75) Inventors: Timothy D. Tonyan, Wheaton, IL (US); William A. Frank, Lake Villa, IL (US); Ashish Dubey, Grayslake, IL (US); Kumar Natesaiyer, Grayslake, IL (US); Bartley P. Durst, Clinton, MS (US); Pamela G. Kinnebrew, Vicksburg, MS (US); Toney K. Cummins, Vicksburg, MS (US); Nicholas Boone, Vicksburg, MS (US); William F. Heard, Clinton, MS (US); Michael J. Roth, Raymond, MS (US); Thomas Slawson, Vicksburg, MS (US); James L. Davis, Vicksburg, MS (US); Ryan Stinson, Vicksburg, MS (US); Carol F. Johnson, Vicksburg, MS (US)

(73) Assignee: United States Gypsum Company, Chicago, IL (US)

( * ) Notice: Subject to any disclaimer, the term of this patent is extended or adjusted under 35 U.S.C. 154(b) by 219 days.

(21) Appl. No.: 12/394,564

(22) Filed: Feb. 27, 2009

(65) Prior Publication Data
US 2010/0229715 A1 Sep. 16, 2010

Related U.S. Application Data

(60) Provisional application No. 61/033,258, filed on Mar. 3, 2008.

(51) Int. Cl.
*F41H 5/02* (2006.01)
(52) U.S. Cl. ............. 89/36.02; 89/901; 89/903; 89/920; 428/911; 109/49.5

(58) Field of Classification Search ............... 89/36.02, 89/901–939; 428/911; 109/49.5
See application file for complete search history.

(56) References Cited

U.S. PATENT DOCUMENTS
4,075,805 A 2/1978 Bongiovanni
(Continued)

FOREIGN PATENT DOCUMENTS
EP 0 287 918 A1 10/1988
(Continued)

OTHER PUBLICATIONS

Non-Final Office Action mailed May 26, 2010, U.S. Appl. No. 12/394,448, Dubey et al.
(Continued)

*Primary Examiner* — Stephen M Johnson
*Assistant Examiner* — Samir Abdosh
(74) *Attorney, Agent, or Firm* — Novak Druce + Quigg, LLP; David J. Janci; Philip T. Petti

(57) ABSTRACT

A cementitious armor panel assembly including cementitious armor panel with ballistic and blast resistant properties attached to a frame structure to produce a protective structure. The cementitious armor panels have a continuous phase resulting from the curing of an aqueous mixture of an inorganic cement binder, an inorganic mineral filler having a particle size of about 150-450 microns, a pozzolanic mineral filler, a polycarboxylate based superplasticizer self-leveling agent, and water. The mixture may also contain alkanolamine, and acid or acid salt. Prior to curing, the continuous phase is reinforced with fiber uniformly distributed in the continuous phase before it is cured to form the panel. The panel may be reinforced with a skin attached to at least one surface of the panel.

20 Claims, 16 Drawing Sheets

U.S. PATENT DOCUMENTS

| | | | |
|---|---|---|---|
| 4,158,082 A | 6/1979 | Belousofsky | |
| 4,434,119 A | 2/1984 | Teare | |
| 4,482,385 A | 11/1984 | Satkowski et al. | |
| 4,793,892 A | 12/1988 | Miller et al. | |
| 4,841,705 A | 6/1989 | Fuhrer | |
| 4,891,071 A | 1/1990 | Bright et al. | |
| 4,948,429 A | 8/1990 | Arfaei | |
| 5,350,554 A | 9/1994 | Miller | |
| 5,515,659 A | 5/1996 | MacDonald et al. | |
| 5,522,926 A | 6/1996 | Richard | |
| 5,724,783 A | 3/1998 | Mandish | |
| 5,746,038 A | 5/1998 | Houk | |
| 5,783,297 A | 7/1998 | Wise et al. | |
| 5,997,630 A | 12/1999 | Angelskar et al. | |
| 6,119,422 A * | 9/2000 | Clear et al. | 52/309.8 |
| 6,176,920 B1 | 1/2001 | Murphy et al. | |
| 6,290,770 B1 | 9/2001 | Moreau et al. | |
| 6,309,457 B1 | 10/2001 | Guerinet et al. | |
| 6,358,603 B1 * | 3/2002 | Bache | 428/323 |
| 6,437,027 B1 | 8/2002 | Isomura et al. | |
| 6,510,667 B1 | 1/2003 | Cottier et al. | |
| 6,562,444 B1 | 5/2003 | Gleeson et al. | |
| 6,620,487 B1 | 9/2003 | Tonyan et al. | |
| 6,849,117 B2 | 2/2005 | Colombet et al. | |
| 6,849,118 B2 | 2/2005 | Kerkar et al. | |
| 6,858,074 B2 | 2/2005 | Anderson et al. | |
| 6,873,920 B2 | 3/2005 | Dunleavy et al. | |
| 6,875,801 B2 | 4/2005 | Shendy et al. | |
| 6,942,727 B2 | 9/2005 | Daczko et al. | |
| 6,976,345 B2 | 12/2005 | Keshmiri | |
| 6,986,812 B2 | 1/2006 | Dubey et al. | |
| 7,166,159 B2 | 1/2007 | Colombet et al. | |
| 7,348,061 B2 | 3/2008 | Girard et al. | |
| 7,445,738 B2 * | 11/2008 | Dubey et al. | 264/128 |
| 7,732,032 B2 | 6/2010 | Dubey | |
| 2002/0004559 A1 | 1/2002 | Hirata et al. | |
| 2002/0121230 A1 | 9/2002 | Colombet et al. | |
| 2002/0182954 A1 | 12/2002 | Porter | |
| 2003/0167973 A1 | 9/2003 | Peev et al. | |
| 2004/0149174 A1 | 8/2004 | Farrington et al. | |
| 2004/0198873 A1 | 10/2004 | Bury et al. | |
| 2004/0211342 A1 | 10/2004 | Sprouts et al. | |
| 2004/0231567 A1 | 11/2004 | Dulzer et al. | |
| 2005/0005821 A1 | 1/2005 | Colombet et al. | |
| 2005/0064055 A1 | 3/2005 | Porter | |
| 2005/0064164 A1 | 3/2005 | Dubey et al. | |
| 2005/0139308 A1 | 6/2005 | Aldea et al. | |
| 2005/0223651 A1 | 10/2005 | Lange-Kornbak et al. | |
| 2005/0239924 A1 | 10/2005 | Lettkeman et al. | |
| 2005/0252165 A1 | 11/2005 | Hubbell | |
| 2005/0274294 A1 | 12/2005 | Brower et al. | |
| 2006/0048997 A1 * | 3/2006 | Foster et al. | 181/285 |
| 2006/0105156 A1 | 5/2006 | Simmonsen et al. | |
| 2006/0169176 A1 | 8/2006 | Reddy et al. | |
| 2006/0174572 A1 * | 8/2006 | Tonyan et al. | 52/481.2 |
| 2006/0243169 A1 | 11/2006 | Mak et al. | |
| 2006/0281836 A1 | 12/2006 | Kerns et al. | |
| 2007/0087198 A1 | 4/2007 | Dry | |
| 2007/0110838 A1 | 5/2007 | Porter et al. | |
| 2007/0110970 A1 * | 5/2007 | Dubey | 428/212 |
| 2007/0125042 A1 | 6/2007 | Hughes et al. | |
| 2007/0125273 A1 | 6/2007 | Pinto | |
| 2007/0163189 A1 | 7/2007 | Venegas, Jr. | |
| 2007/0163470 A1 | 7/2007 | Chanut et al. | |
| 2007/0175126 A1 * | 8/2007 | Tonyan et al. | 52/223.7 |
| 2007/0228612 A1 * | 10/2007 | Durst et al. | 264/333 |
| 2007/0240621 A1 | 10/2007 | Qiao | |
| 2007/0256379 A1 | 11/2007 | Edwards | |
| 2008/0099133 A1 * | 5/2008 | Stivender | 156/245 |
| 2008/0101150 A1 * | 5/2008 | George et al. | 366/8 |
| 2008/0101151 A1 | 5/2008 | Frank et al. | |
| 2008/0110276 A1 | 5/2008 | Frank et al. | |
| 2009/0004430 A1 * | 1/2009 | Cummins et al. | 428/113 |
| 2009/0011212 A1 | 1/2009 | Dube et al. | |
| 2009/0239977 A1 | 9/2009 | Dubey et al. | |
| 2010/0229714 A1 | 9/2010 | Tonyan et al. | |
| 2010/0230035 A1 | 9/2010 | Frank et al. | |

FOREIGN PATENT DOCUMENTS

| | | |
|---|---|---|
| EP | 0 299 253 A1 | 1/1989 |
| EP | 0 934 915 A1 | 8/1999 |
| WO | WO 92/13645 A1 | 8/1992 |
| WO | WO 2005/032782 A1 | 4/2005 |
| WO | WO 2009/114319 A2 | 9/2009 |

OTHER PUBLICATIONS

U.S. Appl. No. 12/394,506 to Frank et al., filed Feb. 27, 2009 (unpublished).

U.S. Appl. No. 12/394,396 to Tonyan et al., filed Feb. 27, 2009 (unpublished).

* cited by examiner

FIG. 16 – Slump of mixes at varying SP and tartaric acid content.
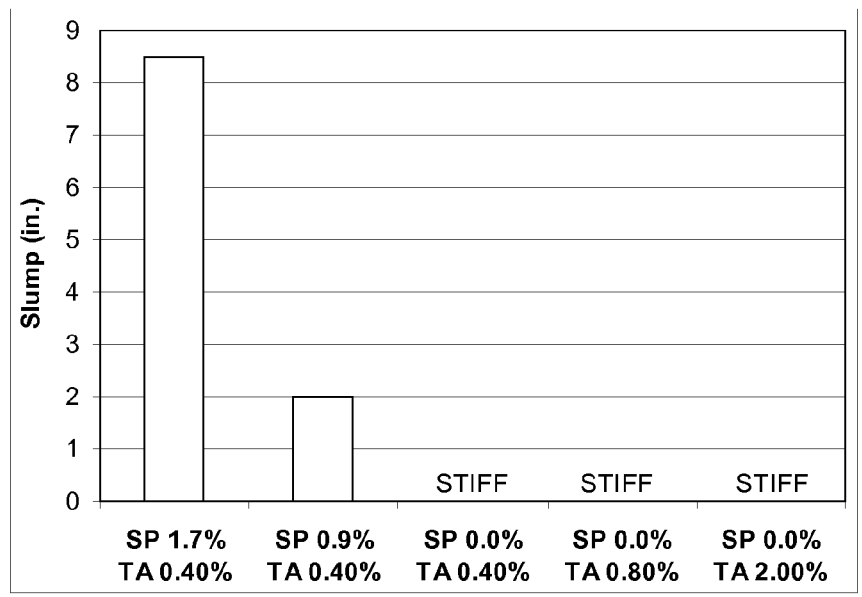
FIG. 17 – Slump loss of Mix 1. (SP at 1.7% by wt. of cementing components, TEA at 0.045% by wt. of Portland cement)
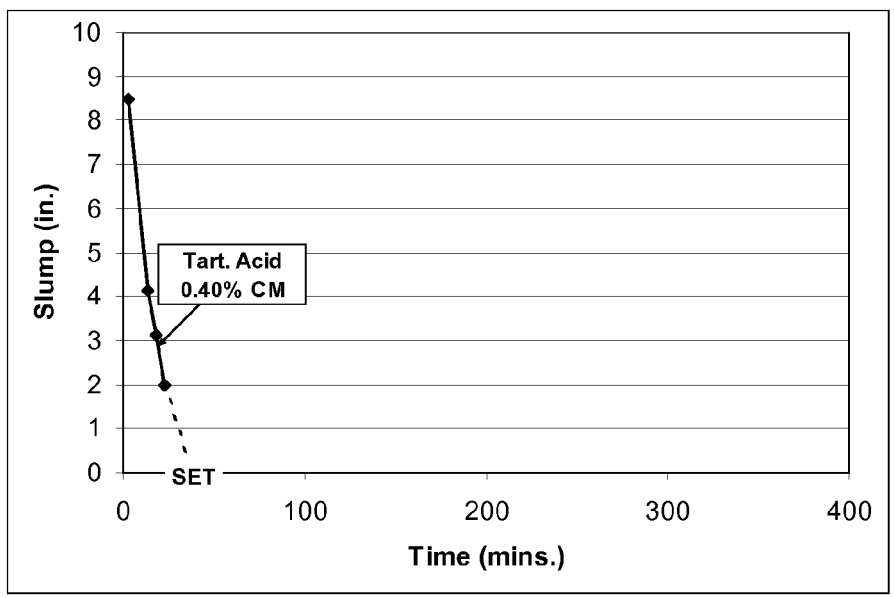

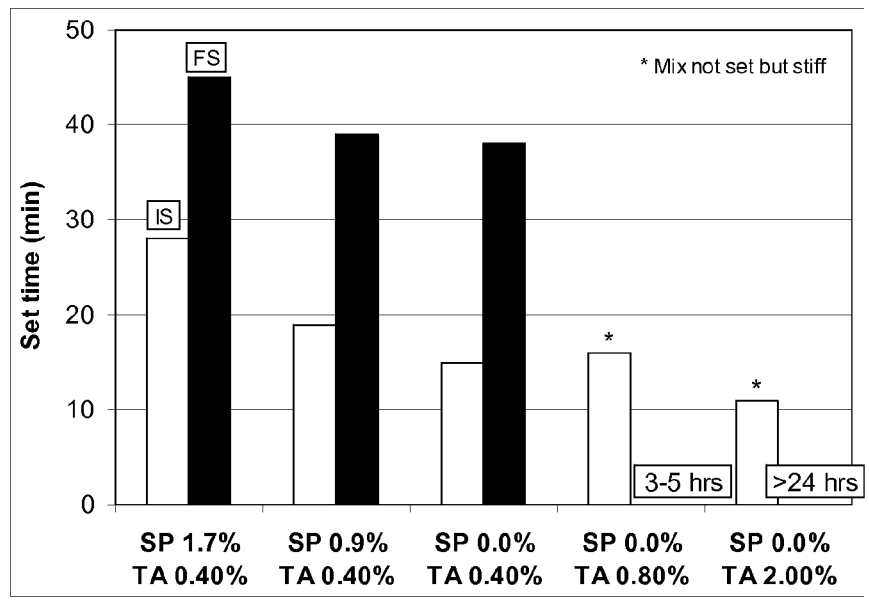
FIG. 18 – Set time of mixes at varying SP and tartaric acid content (IS = Initial Set. FS = Final Set)
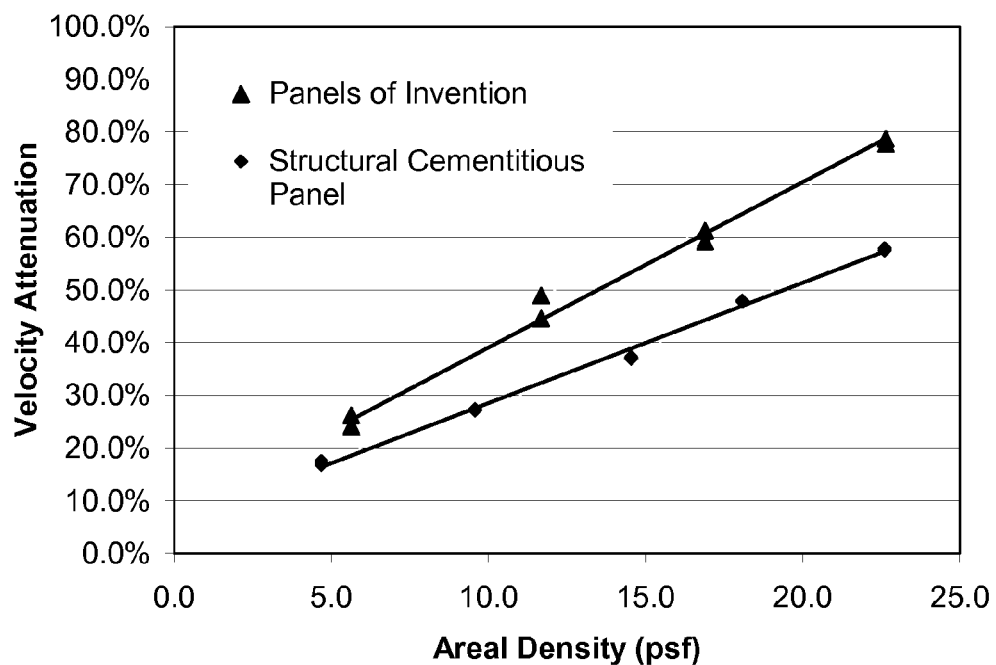
FIG. 19

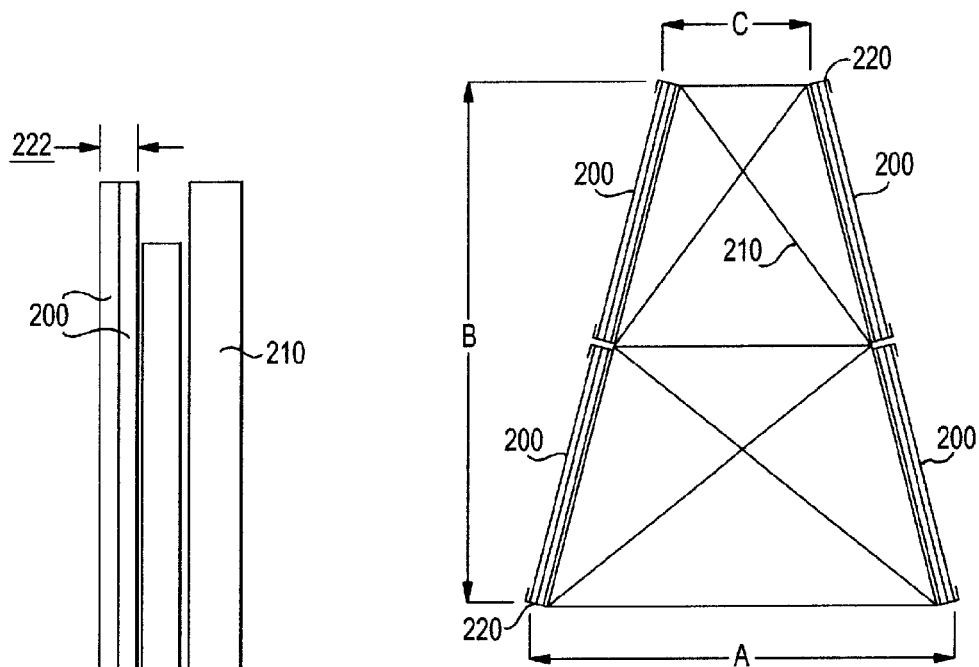
FIG. 23
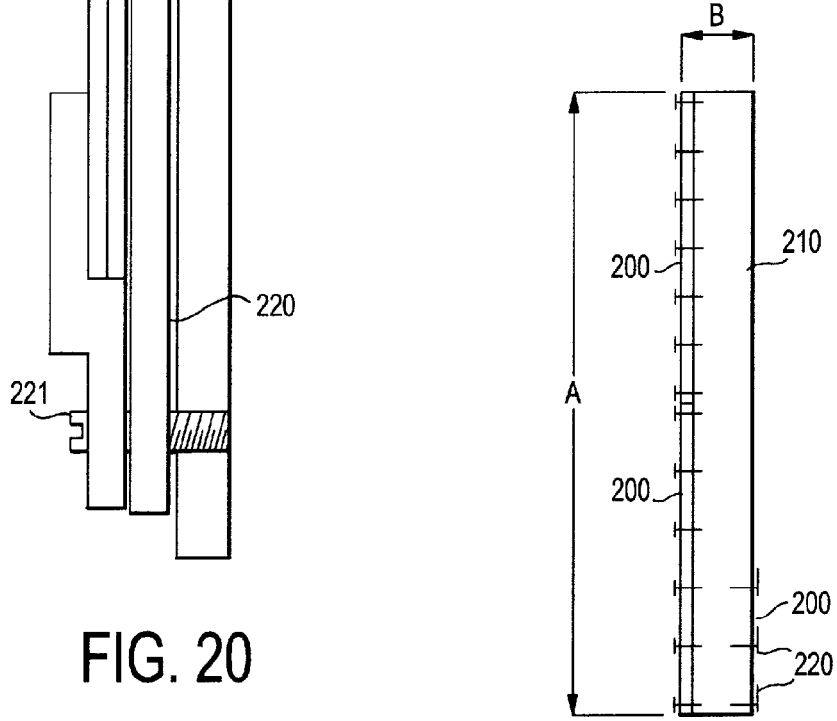
FIG. 20
FIG. 24

CEMENT BASED ARMOR PANEL SYSTEM

CROSS REFERENCE TO RELATED APPLICATIONS

This application claims the benefit of U.S. Provisional Application No. 61/033,258, entitled CEMENT BASED ARMOR PANEL SYSTEM, filed Mar. 3, 2008, incorporated herein by reference, and is related to:

U.S. Provisional Patent Application No. 61/033,240, entitled PROCESS OF MANUFACTURING CEMENT BASED ARMOR PANELS, filed Mar. 3, 2008;

U.S. Provisional Patent Application No. 61/033,212, entitled A SELF LEVELING CEMENTITIOUS COMPOSITION WITH ULTRA-HIGH COMPRESSIVE STRENGTH UPON HARDENING AND ARTICLES MADE FROM SAME, filed Mar. 3, 2008; and U.S. Provisional Patent Application No. 61/033,264, entitled CEMENT BASED LAMINATED ARMOR PANELS, filed Mar. 3, 2008;

U.S. Provisional Patent Application No. 61/033,061, entitled TRANSPORTABLE MODULAR SYSTEM OF COMPONENTS FOR PHYSICAL PROTECTION, filed Mar. 3, 2008; and U.S. Provisional Patent Application No. 61/033,059, entitled TRANSPORTABLE MODULAR FRAME FOR HOLDING PANELS FOR PHYSICAL PROTECTION, filed Mar. 3, 2008;

STATEMENT OF FEDERALLY SPONSORED RESEARCH

The research work described here was supported under Cooperative Research and Development Agreement No. CRADA-05-GSL-04 between the Geotechnical and Structures Laboratory, Engineer Research & Development Center, U.S. Army Corps of Engineers and United States Gypsum Company.

all herein incorporated by reference in their entirety.

FIELD OF THE INVENTION

This invention relates generally to an improved high-performance cement based armor panel system of a unique fiber reinforced cementitious core composition with controlled strength development and a high performance skin-reinforcement attached to at least one surface of the cementitious core panel combined with framed or framed with infill support structures to provide security and blast resistance performance to withstand the combination of forces imposed on it when exposed to loads created by high energy pressure waves (shock waves); impact forces from high velocity explosive charges, and punctures and punch through forces from shrapnel and bullets. The cementitious core does not include silica flour, but does include pozzolanic material such as silica fume.

The cementitious core is made from an inorganic cementitious binder, typically hydraulic cement such as Portland cement; an inorganic mineral filler, preferably silica sand of 150-450 micron median particle size and 0.80-1.50:1 weight ratio to the cementitious binder; a pozzolanic micro filler, preferably silica fume of average particle size of about 0.1 micron; an organic based self-leveling chemical agent, based upon polycarboxylated chemistry, preferably polycarboxylated polyether, at 0.75-2.5% total product weight on a dry basis, triethanolamine and tartaric acid additives to extend the setting time of final cure, reinforcing fibers such as glass fibers and water.

The cementitious core composition is used in combination with a fiber reinforced skin material used to laminate at least one surface of the cementitious core of the panel. A variety of skins can be used to laminate the core of the cementitious armor panel. However, fiber reinforced polymer (FRP) laminates as skins are preferred. Fiberglass reinforced resin is the especially preferred FRP. The skin (S) is placed on the core (C) as a laminate of SC or SCS or SCSCS structural design.

Panels made with the improved cementitious composition have sufficient strength to resist blasts and ballistic impacts with or without steel fibers or steel reinforcement.

BACKGROUND OF THE INVENTION

Fiber reinforced cementitious compositions containing hydraulic cement, inorganic mineral fillers and pozzolans as well as chemical additives such as plasticizers and water dispersants have been used in the construction industry to form the interior and exterior walls of residential and/or commercial structures. However, a drawback of such conventional panels is that they do not have sufficient compressive strength to provide a high degree of resistance to ballistic and blast loads.

Current practice for producing ultra-high strength cementitious compositions relies upon efficient particle packing and extremely low water dosage for achieving ultra-high material strength. As a consequence of the raw materials utilized to achieve dense particle packing and the extremely low water usage in these compositions, the cementitious mixtures have extremely stiff rheological behavior with dough like consistency in the freshly mixed state. The stiff consistency makes these mixtures highly unworkable and extremely difficult to process in conventional manufacturing processes for making thin cement-based products and composites.

U.S. Pat. No. 4,158,082 A to Belousofsky discloses a laminated cement based structure with a fiber glass skin that is impact resistant and may use Portland based cements.

U.S. Pat. No. 4,793,892 to Miller discloses an apparatus manufacturing a concrete panel with cement core and fiber glass facing utilizing Portland cement.

U.S. Pat. No. 4,948,429 A to Arfaei discloses a cementitious composition containing portland cement, sand, fumed silica and a polyether.

U.S. Pat. No. 5,724,783 to Mandish discloses a building panel and assembly system composed of Portland cement panel layers attached to a panel framework with multiple layers.

U.S. Pat. No. 6,119,422 B1 to Clear discloses an impact resistant strong structural cementitious building panel with outer facing of fiberglass reinforcing mesh where the composite cementitious has an aggregate core with inner and outer faces of fiberglass mesh.

U.S. Pat. No. 6,176,920 to Murphy disclose a method of method for constructing a cementitious panel of multiple layers utilizing a smoothing head, shearer and screeding process.

U.S. Pat. No. 6,309,457 B1 Guerinet et al. discloses a self-leveling cementitious composition that includes Portland cement, silica sand of maximum 10 mm size or 0-5 mm size, or a blend of 0-0.4 mm and 0-5 mm size; fine mineral aggregates such as fly ash or silica flour having dimensions of less than 200 microns, preferably less than 100 microns; a first plasticizer which is a water-soluble or water-dispersible organic compound containing at least one aminodi(alkenephosphonic) group; and a second water-soluble or water-dispersible plasticizer which is of the polycarboxylic acid type and contains polyether chains. Example 1 indicates a compressive strength in 28 days of 32 MPa (about 4600 psi).

U.S. Pat. No. 6,437,027 B1 to Isomura et al. discloses a cementitious composition containing portland cement, silica sand of less than 5 mm size; and polycarboxylate of 0.01-2.5 wt. %.

U.S. Pat. No. 6,849,118 B2 to Kerkar et al. discloses a cementitious composition containing Portland cement, silica sand of 0 to 6 mm size; and polycarboxylate (ADVA plasticizer).

U.S. Pat. No. 6,858,074 B2 to Anderson et al. discloses a cementitious composition containing portland cement, silica sand, fumed silica, accelerator, retarder, and polycarboxylate high range water reducing dispersant.

U.S. Pat. No. 6,875,801 B2 to Shendy et al. discloses a cementitious composition containing portland cement, sands, fumed silica and polycarboxylate of 0-2 wt %.

U.S. Pat. No. 6,942,727 B2 Daczko et al. discloses a high early strength cementitious member that includes Portland cement; fine aggregate such as silica sand, the fine aggregate are materials that almost entirely pass through a Number 4 sieve, coarse aggregate such as sand, the coarse aggregate are materials predominantly retained on a Number 4 sieve; silica fume pozzolan; 0.025-0.7% polycarboxylate dispersant based on dry weight of cement; and structural synthetic fibers. The cementitious member can be used to make wall panels. The cementitious member can exhibit 24 hour compression strength greater than 10,000 psi; however these compositions do not contain a pozzolan.

US Pat. App. Pub. No. 2002/0004559 to Hirata et al. discloses a cementitious composition containing portland cement, sands, fumed silica and polyethers of more than 0.5% wt. e.g. 2 wt. %.

US Pat. App. Pub. No. 2004/0149174 to Farrington et al. discloses a cementitious composition containing portland cement, sands, fumed silica and polycarboxylate of 0.01-0.2 wt %.

US Pat. App. Pub. No. 2004/0198873 to Bury et al. discloses a cementitious composition containing portland cement, silica sand, fumed silica and polycarboxylate of 0.02-2 wt %.

US Pat. App. Pub. No. 2004/0211342 to Sprouts et al. discloses a cementitious composition containing portland cement, silica sand, fumed silica and polycarboxylate of 0.1-2 wt %.

US Pat. App. Pub. No. 2004/0231567 to Dulzer et al. discloses a cementitious composition containing portland cement, sand, fumed silica and polycarboxylate of 0.1-10 wt % of the total dry cementitious binder.

US Pat. App. Pub. No. 2005/0139308 to Aldea disclose a system and method using a FRP reinforced cementitious material or composite that may include Portland cement, fly ash, silica fume, resins, sand, glass fibers, resins, water, accelerators, fillers, setting retardants, dispersing agents; involves multiple layers and toweling to smooth between layers; and may be used to strengthen structures against earthquakes and explosions. In Aldea, the layers are applied in situ by toweling and are not applied to form a free standing panel which can be attached to a frame. The structure made in Aldea has two concrete layers bonded to a fiberglass mat.

US Pat. App. Pub. No. 2005/0239924 to Lettkeman et al. discloses a cementitious composition containing portland cement, fine sands, fumed silica and polycarboxylate of 0.05-2.5 wt %.

US Pat. App. Pub. No. 2005/0274294 to Brower et al. discloses a cementitious composition containing portland cement, fine sands, fumed silica and polycarboxylate of 1-4% wt.

US Pat. App. Pub. No. 2006/0281836 to Kerns et al. discloses a cementitious composition containing portland cement, fine sands, fumed silica and polycarboxylate.

US Pat. App. Pub. No. 2007/0125273 to Pinto discloses a cementitious composition containing portland cement, fine sands, fumed silica and polycarboxylate such as 1-2 wt. %.

US Pat. App. Pub. No. 2007/0175126 to Tonyan et al, incorporated herein by reference in its entirety, discloses a structural cementitious panel.

US Pat. App. Pub. No. 2007/0228612 A to Durst et al., incorporated herein by reference, discloses blast resistant concrete also suitable for limiting penetration of ballistic fragments.

SUMMARY OF THE INVENTION

The present invention has utilized a unique combination of inorganic and organic materials with specific size properties that when mixed with water lead to excellent flow properties and self-leveling behavior in the freshly mixed stage and ultra-high compressive strength of at least 10,000, 15,000 or 20,000 psi upon curing of the cementitious composition with controlled strength development after 28-day curing compared to the typical range of 3000-5000 psi obtained with typical full density normal strength concrete.

The present product overcomes the above described deficiencies of the current cementitious materials used to make ultra-high strength cementitious materials and provides a cementitious binder material that is self-leveling in its freshly mixed state and extremely strong upon hardening.

The self leveling behavior of the freshly mixed cementitious material is defined herein as the characteristic property that allows the material to flow and seek horizontal level without the aid of external vibration or energy. Prior art attempts to achieve self leveling have required the use of excess water in the mixtures, which have produced unacceptable composite material with very low compressive strength performance.

The present invention relates to a panel comprising a core having a continuous phase of a cementitious composition. The primary ingredients of the core material are: 25-45 wt. % inorganic cementitious binder (for example Portland cement), 35-65 wt. % inorganic mineral filler (for example silica sand) having a particle size of about 150-450 microns, 5-15 wt. % pozzolanic micro filler (for example silica fume), 0.75-2.5 wt. % self-leveling chemical agent (for example carboxylated polyether) and 6-12 wt. % water and an absence of silica flour. The composition may also have alkanolamine and acid (or acid salt) fluidity additives to extend the setting time for final cure.

Fiber reinforcement may be dispersed through the continuous phase. The fiber reinforced cementitious armor panel has ultra-high compressive strength for withstanding ballistic and blast loads which can range up to at least about 10,000 psi. These cementitious panels may have uses other than as blast resistant panels due to their high strength. Typical reinforcing fibers are alkali resistant glass fibers. Panels can be designed with less strength and lighter weight for use, for example, in construction in earthquake zones.

The panel may have a laminate skin surface on one or both sides of the cementitious core. Fiber reinforced polymer (FRP) skin material is typically laminated on one or both sides of the cementitious core. A variety of skins can be used to laminate the core of the cementitious armor panel. However, fiber reinforced polymer (FRP) laminates as skins are preferred. Fiberglass reinforced resins such as woven fiberglass reinforced polyester, polyethylene, polypropylene are especially preferred FRP. The skin (S) is placed on the core (C) as a laminate of SC or SCS or SCSCS structural design.

The skin may be applied to one or more sides of the panel or completely cover the panel, e.g., a rectangular panel could be covered on both sides and all four edges. Further, the elastic material for covering the panels may be of the type described in US patent application publication no. US 2009-0004430 A1, patent application Ser. No. 11/819,340 reinforced Elastomeric Configuration Tailored to Meet a User's Requirements for Protecting a Structure and a Structure Comprised Thereof, filed Jun. 27, 2007, incorporated herein by reference. Methods for applying the elastomeric material to the panel are also provided in US patent application publication no. US 2009-0004430 A1, patent application Ser. No. 11/819,340. Other FRPs are also suitable for use with structures of the present invention.

The cementitious armor panel may be attached to at least one side of a frame structure, such as a metal frame.

In an embodiment of the invention, one or more cementitious panels are mounted on to the frame by use of fasteners such as "Z" clips or "H" clips wherein the cementitious panels are laid into a channel formed by the fasteners which are attached on one side to the metal frame. The cementitious panels are mounted on at least one surface of the metal frame.

In another embodiment of the cementitious armor panel system, the cementitious panels are mechanically and/or adhesively fastened to the frame structure using mechanical fasteners that pass through pre-drilled holes in the panels or which are adhesively attached to the frame by adhesives such as an epoxy.

In a further embodiment of the cementitious armor panel system of the invention, an infill material e.g. concrete, sand, cellular concrete with a density of about 10-50 pounds per cubic ft (pcf) and light weight aggregate (e.g. expanded shale or expanded clay), is placed in the cavity between the frame to provide added protection against blast and ballistic impact.

The process of this invention also allows for the self-leveling properties of the cementitious composition for easy formation of panels without the need for increased water that would have to be removed.

As previously discussed, there is a need for building panels that are capable of replacing currently available panels which suffer from the following deficiencies: poor flow properties, a requirement for significant amounts of water to be non-self leveling and when made into cementitious panels, have insufficient compressive strength to resist ballistic and blast loads, inferior toughness performance, and poor handleability during installation.

All percentages and ratios are by weight unless otherwise indicated.

BRIEF DESCRIPTION OF THE DRAWINGS

FIG. 16 is a graph showing the slump of mixes of Example 13.

FIG. 17 shows the slump loss for Mix 1 of Example 13.

FIG. 18 shows set times (initial and final) measured for these mixes of Example 13 using Gillmore needles.

FIG. 19 is a graph of the ballistic velocity attenuation versus areal density for a cementitious armor panel of the present invention (no laminate) compared to that of a structural cementitious panel.

FIG. 20 is a perspective view of a "Z Clip" fastener which can be used to mount cementitious armor panels to a frame structure to form an assembly of the invention.

FIG. 23 is a diagram of a multiple layers of cementitious armor panels "loose laid" in a track system on an "A" frame structure using Z clips.

FIG. 24 is a sectional view of a frame structure of the invention configured as a vertical wall assembly with panels attached to a vertical frame using mechanical fasteners.

DETAILED DESCRIPTION OF THE EMBODIMENTS

A. The Panel

Figure 1:
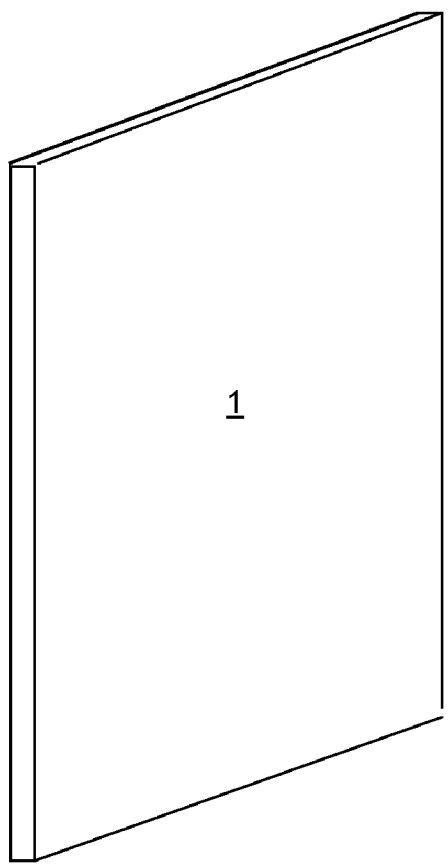
FIG. 1 is a perspective view of the cementitious armor panel of this invention with a fiber reinforced cementitious core and laminated FRP skin attached to at least one surface of the cementitious core.

The present invention relates to a fiber reinforced, dimensionally stable cementitious board panel. FIG. 1 shows a perspective view of a panel 1 of the invention.

Figure 1A:
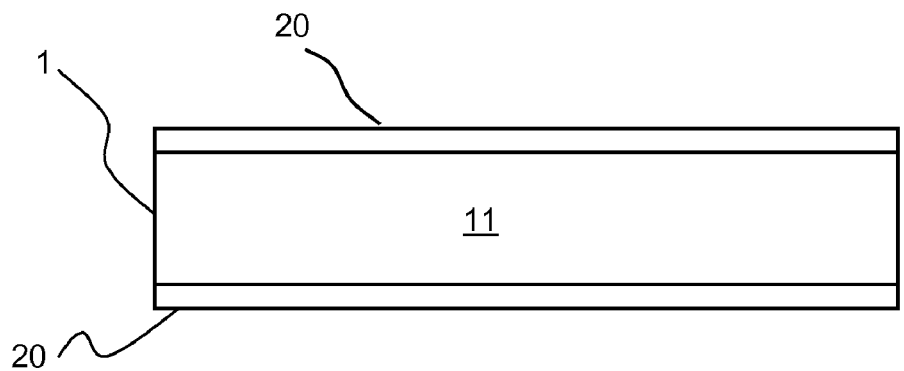
FIG. 1A is a cross section view of the cementitious armor panel of this invention with a fiber reinforced cementitious core and laminated fiber reinforced polymer (FRP) skin attached to both surfaces of the cementitious core, wherein typically the FRP skin layer adhesively is attached to both surfaces of the cementitious core.

FIG. 1A shows a side view of the panel 1 of FIG. 1 further provided with sheets of reinforcing material 2 on opposed outer surfaces of the cementitious panel 1. Thus, the panel 1 of FIG. 1 forms the fiber reinforced cementitious core and the sheets 2 of reinforcing material form a cladding on opposed sides of the core. Typical reinforcing sheet materials include fiber reinforced polymer (FRP) or other material as described by U.S. Provisional Patent Application No. 61/033,264, entitled CEMENT BASED LAMINATED ARMOR PANELS, filed Mar. 3, 2008 and herein incorporated by reference in its entirety.

Typically the FRP skin layer is adhesively attached to both surfaces of the cementitious core. For example, the fiber reinforced skin may be laminated to the surface of the core with an epoxy adhesive.

The panel includes a continuous phase core 11 resulting from the curing of an aqueous mixture of cementitious composition and reinforcing fibers such as glass fibers, the panel comprising, 25-45 wt. % inorganic cementitious binder, 35-65 wt. % inorganic mineral filler of 150-450 microns, 5-15 wt. % pozzolanic filler and 0.75-2.5 wt. % superplasticizer self leveling agent such as polycarboxylate based superplasticizer, about 0.005 to about 0.500%, by weight of the cementitious binder of an alkanolamine such as triethanolamine and about 0.10 to about 1.80% by weight of the cementitious components of an acid or acid salt such as tartaric acid, reinforcement fibers such as fiberglass dispersed through the cementitious composition and 6-12% water.

The principal starting materials used to make panels of the invention are inorganic cementitious binder, e.g., hydraulic cement such as Portland cement; inorganic mineral filler such as the preferred silica sand, pozzolanic micro filler such as fumed silica, a self-leveling agent selected from polycarboxylate based compound particularly polyethers and water and reinforcing fibers such as glass fibers and optional additives that can be added to the cementitious material slurry before the slurry is formed into a mat.

Panels of the invention include a continuous phase of cementitious material in which the reinforcing fibers are substantially uniformly distributed. In the panel of FIG. 1 the continuous phase results from the curing of an aqueous mixture of the cementitious material and reinforcing fibers.

B. Formulation

The components used to make the panels of the invention are described in more detail below.

Typical weight proportions of ingredients of one embodiment of the self-leveling, ultra-high compression strength cementitious compositions of the invention are shown in TABLE 1. The inorganic cementitious binder (hydraulic cement) and pozzolanic micro filler together are known as dry reactive powder.

TABLE 1

| Ingredient Class | Preferred Ingredient | Typical Range min. (wt. % of total composition including water) | Typical Range max. (wt. % of total composition including water) | Typical formulation (wt. % of total composition including water) |
|---|---|---|---|---|
| Inorganic cementitious binder | Portland cement | 25.0 | 45.0 | 37.0 |
| Inorganic mineral filler 150-450 micron median particle size | silica sand | 35.0 | 65.0 | 45.7 |
| Pozzolanic micro filler | silica fume average particle size of about 0.1 micron | 5.0 | 15.0 | 6.5 |
| Organic based self-leveling chemical agent (Superplasticizer) | Polycarboxylate-based chemical admixture | 0.75 | 4.5 | 1.3 |
| Water | | 6.0 | 12.0 | 9.6 |

The proportions of the dry composition ingredients which include the inorganic cementitious binder and pozzolanic micro filler, hereinafter also referred to as the dry reactive powder, and the inorganic mineral filler are shown in TABLE 1A.

TABLE 1A

Formulation on dry basis

| Ingredients | Preferred Ingredient | Minimum typical wt. % (dry basis) | Maximum typical wt. % (dry basis) | Typical formulation wt. % (dry Basis) |
|---|---|---|---|---|
| Inorganic Hydraulic Cement (binder) | Portland Cement | 25.0 | 55.0 | 41.5 |
| Inorganic Mineral Filler (150-450 micrometers median particle size) | Silica sand | 30.0 | 60.0 | 51.2 |
| Pozzolanic Micro Filler | Silica Fume | 2.0 | 15.0 | 7.3 |

Note:
Inorganic hydraulic cement and pozzolanic micro filler combined together are termed Dry Reactive Powder.

Pozzolanic Micro Filler

Pozzolanic materials are defined in ASTM C618-97 as "siliceous or siliceous and aluminous materials which in themselves possess little or no cementitious value, but will, in finely divided form and in the presence of moisture, chemically react with calcium hydroxide at ordinary temperatures to form compounds possessing cementitious properties." One often used Pozzolanic material is silica fume, finely divided amorphous silica which is the product of silicon metal and ferro-silicon alloy manufacture. Characteristically, it has high silica content and low alumina content.

Pozzolanic material typically has the median particle size listed in TABLE 2

TABLE 2

Pozzolanic Filler For example, Silica Fume, Metakaolin, Volcanic Ash, Pumice

| Median Particle Size (microns) | Range Type |
|---|---|
| ≦50 | Broad |
| ≦10 | Preferred |
| ≦1.0 | More Preferred |
| ≦0.1 | Most Preferred |

In one embodiment of the invention, silica fume, finely divided amorphous silica which is the product of the reaction of a silicon metal and ferro-silicon alloy manufacture, is the preferred pozzolanic micro filler. The average particle size of the silica fume particles is extremely small, i.e. about 0.1 microns, or almost one hundred times smaller than the average particle size of the Portland cement grains. In the broadest embodiment, the mean particle size of the pozzolanic material should be less than about 50 microns, with a typical particle size of 10 micros or less and more typically a mean particle size of 1.0 microns or less. In a preferred embodiment the mean particle size of the pozzolanic material is 0.1 microns or less, which has been found to provide optimal particle packing, pozzolanic reaction and compressive strength development. The addition of inorganic, pozzolanic micro filler in the composition serves two critical functions in the composition.

The fine particle size of pozzolanic micro fillers plays a critical role in filling the empty spaces of varying sizes between the larger particles present in the mixture. Without these filler particles, these empty spaces would either be unfilled, forming air voids or become filled with water. The voids will ultimately lead to a reduction in both the density and compressive strength of the final material. The micro fillers filling these spaces lead to a significantly denser microstructure and enhance material compressive strength performance.

The silica fume pozzolanic filler also reacts with calcium hydroxide produced as a result of the hydration of the Portland cement. The reaction results in the formation of calcium silicate hydrate, which is a durable and extremely strong bonding material that enhances the strength and durability of the hardened cement based composition.

Various natural and man-made materials have been referred to as having pozzolanic properties, including pumice, perlite, diatomaceous earth, tuff, trass, metakaolin, microsilica, ground granulated blast furnace slag, and fly ash. While silica fume is a particularly convenient pozzolan for use in the panels of the invention, other pozzolanic materials may be used. In contrast to silica fume, metakaolin, ground granulated blast furnace slag, and pulverized fly ash have a much lower silica content and large amounts of alumina, but can be effective pozzolanic materials. When silica fume is used, it will constitute about 5 to 20 wt. %, preferably 10 to 15 wt. %, of the reactive powders (examples of reactive powders: hydraulic cement only; blends of hydraulic cement and pozzolan; or blends of hydraulic cement, calcium sulfate alpha hemihydrate, pozzolan, and lime). If other pozzolans are substituted, the amounts used will be chosen to provide chemical performance similar to silica fume.

Silica fume is quite distinct from other fine particle inorganic mineral fillers such as silica flour defined in CAS Number 87347-84-0 as silicone dioxide made by grinding pure silica sand to a very fine powder. Silica flour is commonly used as cheap filler in concrete compositions and plastics.

Silica fume defined by CAS Number 67256-35-3, is made by a very different way by reacting silicon tetrachloride in an oxy-hydrogen flame that has an excess of oxygen. The resulting solid is a very light, fluffy, pourable pozzolanic material which has been used in cementitious compositions to improve compression strength, bond strength and abrasion resistance.

The ratio of the pozzolanic micro filler to the inorganic cementitious binder has been found to be broadly useful in the range of 0.05 to 0.30, e.g. 5 parts to 30 parts by weight pozzolanic filler to 95 to 70 parts by weight cementitious binder. A more preferred ratio has been found to be 0.10 to 0.25 and the most preferred ratio of 0.15 to 0.20 has been found to give optimal for self-leveling performance, packing efficiency, pozzolanic reaction and controlled compressive strength development in the final cured composition. TABLE 2C lists ranges of Pozzolanic Filler/Inorganic Hydraulic Cement Ratios.

TABLE 2A

Pozzolanic Filler/Inorganic Hydraulic Cement Weight Ratio

| Ratio | Preference Type |
|---|---|
| 0.05 to 0.30 | Preferred |
| 0.10 to 0.25 | More Preferred |
| 0.15 to 0.20 | Most Preferred |

Inorganic Cementitious Binder (Inorganic Hydraulic Cement)

The preferred inorganic cementitious binders are selected from the various classes of Portland cements, with the commercially available ones with coarser particle size being most preferred in the instant composition. The Blaine fineness of the Portland cement used in the cementitious compositions of this invention typically ranges between 2000 to 6000 cm$^2$/gram.

It has been found that the relatively lower water demand of the Portland cements with coarser particle size results in mixtures with higher material density and enhanced material compressive strength performance.

Inorganic Mineral Filler

The preferred inorganic mineral filler are silica sands that have particular particle size distributions as described further below. These fillers have several extremely important functions in the composition of the invention.

Dimensional stability of the final product made with the cementitious composition of this invention is significantly enhanced with the use of the inorganic mineral filler. Pure portland cement compositions tend to be highly dimensionally unstable under varying hydro-thermal conditions. Mineral fillers such as silica sands help to improve the dimensional stability of the material without sacrificing the materials mechanical performance.

Pure portland cement compositions are extremely prone to shrinkage and associated development of cracks due to restrained plastic shrinkage of the material as it undergoes hardening. The effect of restrained plastic shrinkage becomes even more severe for compositions containing very low water content, particularly in the presence of pozzolanic materials like silica fume. Silica sand has been found to play an important role in controlling, and in some cases eliminating, development of cracks due to restrained plastic shrinkage.

Proper selection of particle size range of the inorganic mineral filler has been found to be instrumental in providing a denser particle packing to the cementitious mixture of this invention. A denser packing leads to less intrinsic flaws in the final material and this in turn, ultimately enhances the mechanical performance and compressive strength of the composite material.

The particle size of the inorganic mineral filler and the total amount of the filler used in the cementitious mixture has been found to contribute significantly to the self-leveling properties of the mixture. It has been found that if the inorganic mineral filler has an average particle size that is very fine, the material will have poor flow properties with no self-leveling behavior. Additionally, it has been found that if the amount of the inorganic mineral filler is too high i.e. reaches a critical limit; the mineral will also have poor flow properties and no self-leveling behavior.

A particle size distribution of the inorganic filler that has been found to lead to self-leveling properties and ultra-high compressive strength performance is shown in TABLE 2B.

TABLE 2B

| Inorganic filler particle size in microns | % Finer |
| --- | --- |
| 1000 | 100 |
| 600 | 90-100 |
| 300 | 40-90 |
| 150 | 10-40 |
| 50 | Less than 10 |

The inorganic mineral filler content of the composition found to provide self-leveling behavior to the final composition is described by the weight ratio of inorganic filler to cementitious material within the range of 0.80 to 1.50:1.0 on a dry basis.

The median particle size of the inorganic mineral filler in the composition of the invention should be in the range of 150 to 450 microns, more typically in the range of 200 to 400 microns and preferably in the range of 250 to 350 microns. When a median particle size in the range of about 250 to about 350 microns is used, the composition has been found to exhibit optimal self-leveling behavior, plastic shrinkage cracking control, efficient particle packing and optimum compressive strength development. Typical inorganic mineral filler has the median particle size listed in TABLE 2C.

TABLE 2C

| Inorganic Mineral Filler For example, Silica Sand, Zirconia Sand, Alumina Sand | |
| --- | --- |
| Median Particle Size | Range Type |
| 150-450 microns | Preferred |
| 200-400 microns | More Preferred |
| 250-350 microns | Most Preferred |

Another parameter that has been found to provide optimal results is the ratio of the inorganic mineral filler, e.g., silica sand, to dry reactive powder (the combined weight of the inorganic cementitious binder and the pozzolanic micro filler reactive powders). Good results are obtained at ratios of from about 0.75 to 1.50:1.0 with more preferred results being at ratios of 0.80 to 1.20:1.0 and optimum self leveling, efficient particle packing and compressive strength development being achieved at ratios of 0.90 to 1.10:1.0, e.g., 90 to 110 parts by weight of inorganic mineral filler such as silica sand to 100 parts of combined cementitious binder and pozzolanic filler. TABLE 2D lists ranges for Inorganic Mineral Filler/Dry Reactive Powder Ratios.

TABLE 2D

| Inorganic Mineral Filler/Dry Reactive Powder Weight Ratio | |
| --- | --- |
| Ratio | Preference Type |
| 0.75 to 1.50 | Preferred |
| 0.80 to 1.20 | More Preferred |
| 0.90 to 1.10 | Most Preferred |

Note:
Inorganic hydraulic cement and pozzolanic micro filler combined together are termed Dry Reactive Powder.

Water

Typically the weight ratio of water to the inorganic cementitious binder and pozzolanic filler dry reactive powder is maintained at 0.35 or less, with a typical ratio being below about 0.25 to 0.30:1.0 and optimum particle packing and compressive strength being achieved at water to reactive powder ratios of 0.20:1.0 or less. TABLE 2E lists ranges for Water/Dry Reactive Powder Ratio.

TABLE 2E

| Water/Dry Reactive Powders Weight Ratio | |
| --- | --- |
| Preferred Ratio | Range Type |
| ≦0.35 | Maximum water/dry reactive powders ratio |
| ≦0.30 | Preferred |
| ≦0.25 | More Preferred |
| ≦0.20 | Most Preferred |

Note:
Inorganic hydraulic cement and pozzolanic micro filler combined together are termed Dry Reactive Powder.

Self-Leveling Agent—Superplasticizer

Organic admixtures based on polycarboxylate chemistry have been found to be exclusively effective self-leveling agents in the composition of the invention and provide the required fluidity and flow properties for development of long term compressive strength of the cured cementitious armor panel.

Polycarboxylate based compositions have been found to be effective when used in an amount of from about 0.25 to 5.00% by weight, and more typically 0.50 to 3.0% by weight of the cementitious material on a dry basis. Amounts at levels below about 0.25% do not provide any significant improvement in fluidity and flow properties of the cementitious material. Use of levels of the polycarboxylate based Superplasticizer above about 5.0% by weight, causes a significant adverse impact upon the long term development of compressive strength. TABLE 2F lists ranges for superplasticizer.

TABLE 2F

Superplasticizer Polycarboxylate polyethers

| Dosage Range | Range Type |
|---|---|
| 0.25 to 5.00 wt % of dry reactive powders | Broad Range |
| 0.50 to 3.00 wt % of dry reactive powders | Preferred Range |
| 0.75 to 1.50 wt % of dry reactive powders | More Preferred Range |
| 1.00 to 1.25 wt % of dry reactive powders | Most Preferred Range |

Note:
Inorganic hydraulic cement and pozzolanic micro filler combined together are termed Dry Reactive Powder.

When the polycarboxylate superplasticizer is used in the specified dosages in admixture with the other components of the cementitious composition of the invention, self-leveling cementitious compositions are obtained.

Typically, the polycarboxylate superplasticizer can be reduced to about 0.75 to 1.50% by wt. of dry reactive powders and down to about 1.0 to 1.25% by wt. of the of dry reactive powders while still giving the desired period of fluidity and long term compressive strength development when alkanolamines, e.g. TEA, and acid additives, e.g. tartaric acid, are used within the amounts specified in the present invention.

The term polycarboxylate based self-leveling agent used throughout this specification refers to polymers with a carbon backbone with pendant side chains, wherein at least a portion of the side chains are attached to the backbone through a carboxyl group or an ether group. Examples of these polycarboxylate compositions can be found in U.S. Pat. No. 6,942,727 B2 at Col. 4, lines 16-32, which is incorporated herein by reference. Polycarboxylate dispersants are very effective in dispersing and reducing the water content in hydraulic cements. These dispersants or Superplasticizers operate by surrounding a particle to be dispersed, and then repulsion forces between each polymer chain keeps the particles apart and more fluid.

The polycarboxylate agent used in the cementitious composition may include but is not limited to dispersants or water reducers sold under the trademarks GLENIUM 3030NS, GLENIUM 3200 HES, GLENIUM 3000NS (Master Builders Inc., Cleveland, Ohio), ADVA (W. R. Grace Inc., Columbia, Md.), VISCOCRETE (Sika, Stockholm, Sweden), and SUPERFLUX (Axim Concrete Technologies Inc., Middlebranch, Ohio). Two examples of commercially available polycarboxylated polyether compositions that have provided good results in this invention are Adva® Cast and Adva® Cast 500, commercially available from W.R. Grace, Columbia, Md.

Alkanolamine and Acid/Acid Salt

As mentioned above, alkanolamine, e.g., triethanolamine (TEA) and acid or acid salt, e.g., tartaric acid, may be added to control the fluidity of the cementitious composition. The addition of about 0.005% to about 0.500% TEA by weight of cementitious material, more typically 0.010% to about 0.250% by weight, more preferably 0.020% to 0.100 wt % and most preferred about 0.025 to 0.075% by weight of dry reactive powder allows the use of a lower amount of leveling agent Superplasticizer. For example, addition of alkanol amine and acid/acid salt permits using only about of one-third of the amount otherwise used while obtaining the desired rate of development of compressive strength of the panel.

Moreover, addition of alkanolamine and acid/acid salt delays the period of curing to allow for handling and finishing of the cementitious armor panel. This also allows the cementitious composition to have a longer period to handle the panel between the time the panel hardens enough to be handled and be sanded for final finishing before the cementitious composition reaches its fully hardened final panel form. At amounts less than about 0.005%, the curing time is too fast and there is no improvement in the development of long term compressive strength of the panel.

When more than 0.500% of TEA is used, the cure is too fast for improving the period of handling and the compressive strength does not develop over a sufficient period of time to give compressive strength levels of more than about 10,000 psi, for example from 15,000 psi or 20,000 psi to 25,000 to 30,000 psi for effective blast and ballistic resistance.

TABLE 2G lists ranges for alkanolamines. Examples of suitable alkanolamines for use in embodiments of the present invention include one or more of monoethanolamine, diethanolamine and triethanolamine.

TABLE 2G

Alkanolamines For example, Triethanolamie, Diethanolamine, Monoethanolamine

| Dosage Range | Range Type |
|---|---|
| 0.005 to 0.500 wt % of dry reactive powder | Broad Range |
| 0.010 to 0.250 wt % of dry reactive powder | Preferred Range |
| 0.020 to 0.100 wt % of dry reactive powder | More Preferred Range |
| 0.025 to 0.075 wt % of dry reactive powder | Most Preferred Range |

Note:
Inorganic hydraulic cement and pozzolanic micro filler combined together are termed Dry Reactive Powder.

The use of acids, for example, tartaric acid, or acid salts, in combination with the above-discussed alkanolamines, has been found to be effective in reducing the amount of Superplasticizer needed for fluidity and flow properties. It also improves development of compressive strength gain over time at levels of from about 0.10 to about 1.80% by weight of the cementitious material, with typical use being within the range of about 0.20 to 1.20% and preferred ranges being from about 0.30% to 0.80% by weight and the more preferred amount being from about 0.40% to 0.60% by weight. When tartaric acid is used below about 0.10%, there is no improvement in the development of compressive strength or any reduction in the amount of Superplasticizer required giving the required fluidity and flow properties of the cementitious material. At levels above about 1.8% by wt., the long term development of compressive strength is degraded to levels below the compressive strength required for use as an effective cementitious armor panel.

Other examples of suitable acid/acid salt additives for improving fluidity include, but are not limited to, citric acid, potassium tartarate, sodium tartarate, sodium-potassium tartarate, and sodium citrate.

TABLE 2H lists ranges for acids and acid salts that may be employed in embodiments of the present invention.

TABLE 2H

Acids and Acid-Salts: Tartaric Acid, Potassium Tartarate, Sodium Tartarate, Sodium-Potassium Tartarate, Citric Acid, Sodium Citrate

| Dosage Range | Range Type |
|---|---|
| 0.10 to 1.80 wt % of dry reactive powder | Broad Range |
| 0.20 to 1.20 wt % of dry reactive powder | Preferred Range |
| 0.30 to 0.80 wt % of dry reactive powder | More Preferred Range |
| 0.40 to 0.60 wt % of dry reactive powder | Most Preferred Range |

Note:
Inorganic hydraulic cement and pozzolanic micro filler combined together are termed Dry Reactive Powder.

Reinforcing Fibers

The cementitious armor panels of the invention typically include reinforcing fibers, e.g., glass fibers or steel fibers. However, products without reinforcing fibers also come within the present invention.

The cementitious armor panel is typically reinforced with one or more layers of loose chopped glass fibers embedded into the cementitious layers as the panel is made from cementitious slurry deposited on the forming line, as described in detail below. The glass fibers are chopped to a length of about 0.5 in (1.3 cm) to about 1.5 in (3.8 cm) in length. The glass fibers are monofilaments having a diameter of about 5 to 25 microns (micrometers), typically about 10-15 microns (micrometers).

The cementitious armor panels are uniformly reinforced with glass fibers in an amount of about 0.5% to about 6% by volume of the overall composite material composition, more typically about 3% to about 3.5 volume %, before it is cured to a final cementitious armor panel. The total cementitious composition means the total inorganic binder, inorganic mineral filler, pozzolanic filler, self-leveling agent, and additives like retarders and accelerators. Thus for 100 cubic feet of total composition, there is 0.5 to 6 cubic feet of fibers. The cementitious armor panels are also 0.5-6 volume % of the total wet composition used to make a composite article as well as the composite article itself.

Alkali-resistant glass fibers (AR glass fibers), such as Nippon Electric Glass (NEG) 350Y can be use when alkali resistance is important. Such fibers have been found to provide superior bonding strength to the matrix and are, thus, preferred for panels of the invention. The glass fibers are monofilaments that have a diameter from about 5 to 25 microns (micrometers) and typically about 10 to 15 microns (micrometers). The filaments generally are combined into 100 filament strands, which may be bundled into rovings containing about 50 strands. The strands or rovings will generally be chopped into suitable filaments and bundles of filaments, for example, about 0.25 to 3 inches (6.3 to 76 mm) long, preferably 0.5 to 1.5 inches (13 to 38 mm), more preferably 1 to 1.5 inches (25 to 38 mm).

It is also possible to include other fibers in the cementitious armor panels of the invention in place of some or all of the preferred glass fibers. Such other fibers may be one or more members of the group consisting of cellulosic fibers, such as paper fibers; polymer fibers, for example polyvinyl alcohol, polypropylene, polyethylene, high density polyethylene, polyacrylonitrile, polyamide, polyimide and/or aramid fibers. Carbon fibers and metal fibers such as steel fibers can also be used to reinforce the cementitious armor panels, although glass fibers have provided cementitious armor panels with excellent blast resistance and ballistic impact properties.

Additional Optional Additives

Other known additives for use in cementitious compositions, such as air entrainment additives, surfactants, accelerators, retarders, and additional plasticizers can also be used. In particular, water reducing agents such as polynapthalene sulfonates, ligno-sulfonates and melamine-sulfonates may be added to the continuous phase and will function as secondary plasticizers in combination with the polycarboxylate based Superplasticizer High Performance Skin-Reinforcement The fiber-reinforced, cementitious core of the armor panels is strengthened by means of a high-performance, skin reinforcement bonded to one or both surfaces of the cementitious core. The skin reinforcement may be made of a variety of high performance reinforcement material such as fiber reinforced polymer laminates (FRP), thin metal laminates, composite FRP-metal laminates, open-weave mesh, closed-weave mesh, etc. The skin reinforcement is attached to the cementitious core by means of a bonding agent. For example, adhesives may be used to bond skins to the core. Typical suitable adhesives are urethanes (hot melt and room temperature), epoxies and other polymer adhesives. The skin may be applied to one or more sides of the panel or completely cover the panel, e.g., a rectangular panel could be covered on both sides and all four edges.

Alternatively, the skin reinforcement may be embedded in the cementitious core, thus avoiding the need for a bonding agent.

The elastic material for covering the panels may be of the type described in US patent application publication no. US 2009-0004430 A1, U.S. patent application Ser. No. 11/819,340 reinforced Elastomeric Configuration Tailored to Meet a User's Requirements for Protecting a Structure and a Structure Comprised Thereof, filed Jun. 27, 2007, incorporated herein by reference. Methods for applying the elastomeric material to the panel are also provided in US patent application publication no. US 2009-0004430 A1, U.S. patent application Ser. No. 11/819,340. Other FRPs are also suitable for use with structures of the present invention.

Fiber reinforced polymer laminates such as fiberglass reinforced polyester resin, fiberglass reinforced polyethylene and fiberglass reinforced polypropylene resins are typically used with a Kemlite ArmorTuf® woven fiberglass reinforced polyester resin laminate available from Crane Composites, Inc., being preferred. The FRP laminates may comprise reinforcing fibers embedded in a polymeric resin in either continuous form, discontinuous form, or a combination of both.

A variety of fibers may be used as reinforcement in the FRP laminate. Including such preferred fibers as glass fibers, aramid fibers, Kevlar® fluoropolymer fibers, and metal fibers such as steel fibers.

After final set in the form of a fiber reinforced cementitious panel with a high performance skin-reinforcement attached to at least one surface of the cementitious core, as described below, the panel exhibits the desirable blast resistance and dimensional stability of the cementitious composite material.

Brief Description of Making a Panel of the Present Invention

Forming

The cementitious panel is formed on a forming line by first depositing a layer of chopped fiber such as AR-glass fibers on a carrier on a porous conveyor belt followed by depositing a layer of the cementitious slurry over the layer of chopped fiber and then depositing a second layer of chopped fiber and then passing the layers through an embedment device to embed the randomly glass fibers into the cementitious slurry layer. The steps are then repeated a second time to accumulate a second layer to produce a cementitious panel of approximately 0.50 in. thickness. A third layer of cementitious slurry only is deposited on the top surface of the panel and immediately leveled by a screed plate to provide a relatively smooth top surface of the product panel.

Curing

The resulting panels are then stored on a flat surface and cured at ambient temperature and humidity conditions for an initial period of between 8 and 72 hours after wet forming (casting). The panels are then wetted and wrapped in plastic to prevent loss of moisture. The wrapped panels are cured at 140° F. (60° C.) for 7 days.

Finishing (Surfacing)

Surfacing machinery is used to gauge the panels to a thickness of about 0.50 in. (1.3 cm) e.g., 53 in. and to provide a smooth surface on the top and bottom surfaces of the panel.

Cutting

The panels are cut to the desired size by use of conventional cutting methods such as dry sawing or waterjet cutting.

The flow properties and self-leveling behavior of the cementitious compositions of this invention were characterized using the slump test. The slump test used in the following experiments utilizes a hollow cylinder 5.08 cm. (2 in.) In diameter and 10.16 cm. (4 in.) in length kept vertically on a smooth plastic surface. The cylinder is filled up to the top with the cementitious mixture followed by striking off the top surface to remove the excess slurry mixture. The cylinder is then gently lifted up vertically to allow the slurry to come out from the bottom and spread on the plastic surface to form a circular patty. The diameter of the patty is then measured and recorded as the slump of the material. Compositions with good flow behavior yield a larger slump value.

To make use of conventional, high-efficiency manufacturing methods for producing cement-based products it is desirable that the cementitious slurries have a slump value of less than about 5 inches (12.7 cm). Slurries with a slump value more than 5 inches (12.7 cm) are difficult to handle and process using conventional manufacturing methods.

The influence of various raw material variables on the flow properties and self-leveling behavior was determined using the slump test in the examples described below.

Figure 2:
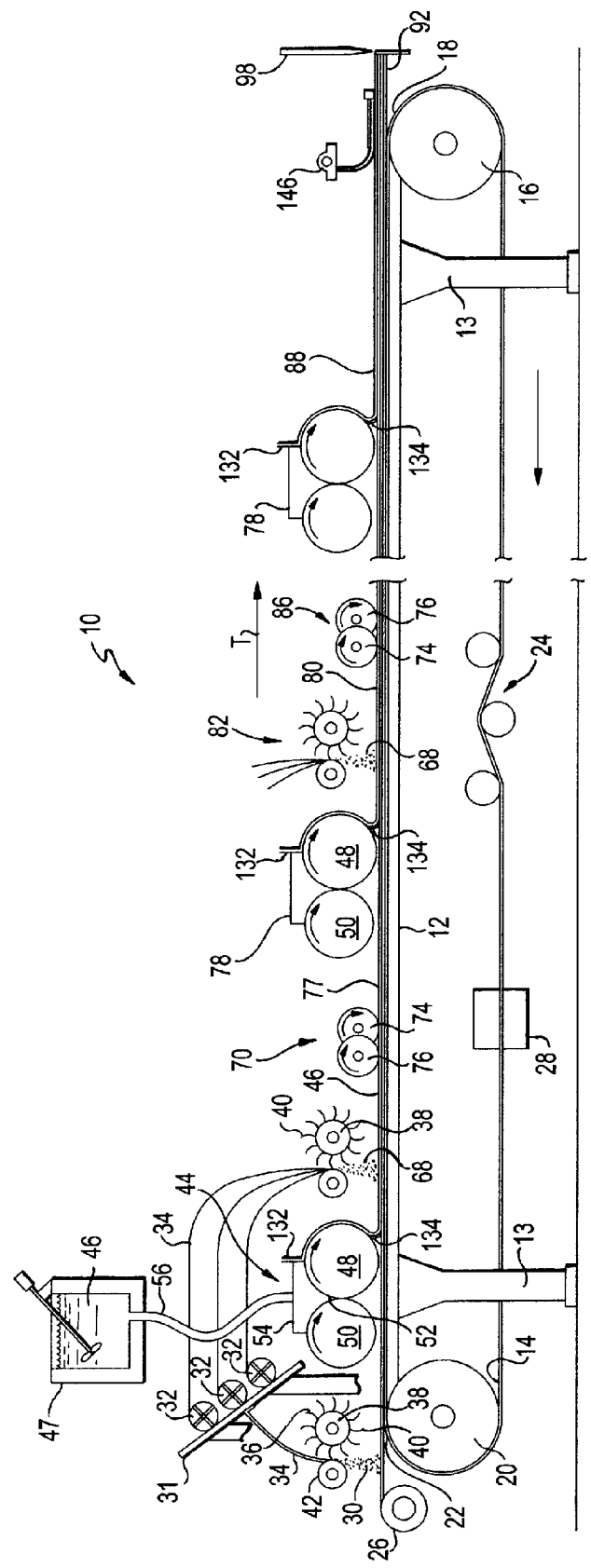
FIG. 2 is a schematic diagram of an appropriate apparatus for performing the present process for producing the cementitious armor panel of the invention.

Detailed Description of a Production Line Process for Making a Cementitious Panel Core Composition of the Invention Referring now to FIG. 2, a cementitious armor panel production line is diagrammatically shown and is generally designated 10. The production line 10 includes a support frame or forming table 12 having a plurality of legs 13 or other supports. Included on the support frame 12 is a moving carrier 14, such as an endless rubber-like conveyor belt with a smooth, water-impervious surface, however porous surfaces are contemplated. As is well known in the art, the support frame 12 may be made of at least one table-like segment, which may include designated legs 13 or other support structure. The support frame 12 also includes a main drive roll 16 at a distal end 18 of the frame, and an idler roll 20 at a proximal end 22 of the frame. Also, at least one belt tracking and/or tensioning device 24 is typically provided for maintaining a desired tension and positioning of the carrier 14 upon the rolls 16, 20. In this embodiment, the panels are produced continuously as the moving carrier proceeds in a direction "T" from the proximal end 22 to the distal end 18.

In this embodiment, a web 26 of Kraft paper, release paper, or a plastic carrier, for supporting a slurry prior to setting, may be provided and laid upon the carrier 14 to protect it and/or keep it clean.

However, it is also contemplated that, rather than the continuous web 26, individual sheets (not shown) of a relatively rigid material, e.g., sheets of polymer plastic, may be placed on the carrier 14.

It is also contemplated that the cementitious armor panels produced by the present line 10 are formed directly upon the carrier 14. In the latter situation, at least one belt washing unit 28 is provided. The carrier 14 is moved along the support frame 12 by a combination of motors, pulleys, belts or chains which drive the main drive roll 16 as is known in the art. It is contemplated that the speed of the carrier 14 may vary to suit the product being made.

Chopper

In this embodiment of the present invention, cementitious armor panel production is initiated by depositing a layer of loose, chopped glass fibers 30 of about 0.5 in. to about 1.5 in. (1.3 to 3.8 cm) in length and about 5 to about 25 micrometers in diameter, and typically 10-15 micrometers in diameter, upon a plastic carrier on the web 26. A variety of fiber depositing and chopping devices are contemplated by the present line 10. For example, a typical system employs a rack 31 holding several spools 32 of fiberglass cord, from each of which a length or string 34 of fiber is fed to a chopping station or apparatus, also referred to as a chopper 36. Typically a number of strands of fiberglass are fed at each of the chopper stations.

The chopper 36 includes a rotating bladed roll 38 from which project radially extending blades 40 extending transversely across the width of the carrier 14, and which is disposed in close, contacting, rotating relationship with an anvil roll 42. In the preferred embodiment, the bladed roll 38 and the anvil roll 42 are disposed in relatively close relationship such that the rotation of the bladed roll 38 also rotates the anvil roll 42, however the reverse is also contemplated. Also, the anvil roll 42 is preferably covered with a resilient support material against which the blades 40 chop the cords 34 into segments. The spacing of the blades 40 on the roll 38 determines the length of the chopped fibers. As is seen in FIG. 2, the chopper 36 is disposed above the carrier 14 near the proximal end 22 to maximize the productive use of the length of the production line 10. As the fiber strands 34 are chopped, the fibers fall loosely upon the carrier web 26.

Slurry Mixer

The present production line 10 includes a slurry feed station or slurry feeder or slurry headbox, generally designated 44 and a source of slurry, which in this embodiment is a wet mixer 47. The slurry feeder 44 receives a supply of slurry 46 from the wet mixer 47 for depositing the slurry 46 on chopped fibers on the carrier web 26.

Slurry Feed Apparatus

Referring now to FIG. 2, as mentioned above, the present slurry feed apparatus, also referred to as slurry feed station, slurry feeder or slurry headbox, generally designated 44 receives a supply of slurry 46 from the wet mixer 47.

The preferred slurry feeder 44 includes a main metering roll 48 disposed transversely to the direction of travel "T" of the carrier 14. A companion or back up roll 50 is disposed in close, parallel, rotational relationship to the metering roll 48. Slurry 46 is deposited in a nip 52 between the two rolls 48, 50.

The slurry feeder 44 also has a gate 132 mounted to sidewalls 54 of the slurry feed apparatus 44 to be mounted adjacent to the surface of the metering roll 48 to form a nip therebetween. The gate 132 is above the metering roll 48 so that the nip is between the gate 132 and an upper portion of the roll 48. The rolls 48, 50 and gate 132 are disposed in sufficiently close relationship that the nip between roll 48 and gate 132 retains a supply of the slurry 46, at the same time the rolls 48, 50 rotate relative to each other. The gate 132 is provided with a vibrator (not shown). The metering roll 48 rotates from the nip 52 to the nip between roll 48 and gate 132.

The gate 132 may be centered over the metering roll 48 or slightly upstream of centered over the metering roll 48.

While other sizes are contemplated, typically the metering roll 48 has a larger diameter than the companion roll 50.

Also, typically one of the rolls 48, 50 has a smooth, stainless steel exterior, and the other, preferably the companion roll 50, has a resilient, non-stick material covering its exterior.

The vibrating gate 132 helps to prevent significant build-up of slurry 46 on the gate 132 and controls the thickness of the slurry 46 deposited on the metering roll 48. The vibrating gate 132 can easily be removed from the wall mounts for cleaning and maintenance. A more detailed description of the vibrating gate can be found in US Pat. App. Pub. 2008/0101150, application Ser. No. 11/555,655 of Nov. 1, 2006, incorporated herein by reference in its entirety.

Typically the slurry feeder 44 has a pair of relatively rigid sidewalls 54 (one shown), preferably made of, or coated with non-stick material such as TEFLON® material or the like. The sidewalls 54 prevent slurry 46 poured into the nip 52 from escaping out the sides of the slurry feeder 44. The sidewalls 54, preferably secured to the support frame 12 (FIG. 2), are disposed in close relationship to ends of the rolls 48, 50 to retain the slurry 46. However, the sidewalls 54 are not excessively close to ends of the rolls to interfere with roll rotation.

An important feature of the present invention is that the slurry feeder 44 deposits an even layer of the slurry 46 of relatively controlled thickness upon the moving carrier web 26. Suitable layer thicknesses range from about 0.16 inch or 0.25 inch. However, with two layers preferred in the cementitious armor panel produced by the production line 10, and a suitable panel being approximately 0.5 inch, an especially preferred slurry layer thickness is in the range of 0.25 inch. However, for a target panel forming thickness is about 0.53 inches, the standard layer thickness is typically closer to about 0.265 inches at each of the two forming stations.

Thus, the relative distance between the vibrating gate 132 and the main metering roll 48 may be adjusted to vary the thickness of the slurry 46 deposited.

To ensure a uniform disposition of the slurry 46 across the entire web 26, the slurry 46 is delivered to the slurry feeder 44 through a hose 56 or similar conduit having a first end in fluid communication with the outlet of the slurry mixer or reservoir 47. A second end of the hose 56 is connected to a laterally reciprocating, cable driven, fluid-powered dispenser of the type well known in the art. Slurry flowing from the hose 56 is thus poured into the feeder 44 in a laterally reciprocating motion to fill a reservoir defined by the rolls 48, 50 and the sidewalls 54 of the slurry feeder 44.

Rotation of the metering roll 48 draws a layer of slurry 46 from the reservoir defined by the rolls 48, 50 and the sidewalls 54 of the slurry feeder 44.

Another feature of the present feeder apparatus 44 is that the main metering roll 48 and the companion roll 50 are both driven in the same direction which minimizes the opportunities for premature setting of slurry on the respective moving outer surfaces. A drive system (not shown), including a fluid-powered, electric or other suitable motor is connected to the main metering roll 48 or the companion roll 50 for driving the roll(s) in the same direction, which is clockwise when viewed in FIG. 2. As is well known in the art, either one of the rolls 48, 50 may be driven, and the other roll may be connected via pulleys, belts, chain and sprockets, gears or other known power transmission technology to maintain a positive and common rotational relationship.

As the slurry 46 on the outer surface of the roll 48 moves toward the moving carrier web 26, it is important that all of the slurry be deposited on the web, and not travel back upward toward the nip 52. Such upward travel would facilitate premature setting of the slurry 46 on the rolls 48, 50 and would interfere with the smooth movement of slurry from the reservoir 57 to the carrier web 26.

To assist in preventing this upward travel, the slurry feeder 44 has a doctor blade 134 located between the main metering roll 48 and the carrier web 26. The doctor blade 134 ensures the slurry 46 uniformly covers the fiberglass fiber layer upon the carrier web 26 and does not proceed back up toward the nip 52 and the feeder reservoir 57. The doctor blade 134 also helps keep the main metering roll 50 free of prematurely setting slurry 46.

The doctor blade 134 removes the slurry from the surface of the metering roll 48 like the wire used in the process of U.S. Pat. No. 6,986,812 to Dubey et al. The doctor blade 134 also serves to collect the slurry 46 in a uniform layer or curtain and downwardly directs the slurry 46 in the direction of the movement of the web to a point about 1.0 to 1.5 inches (2.54 to 3.81 cm.) over the fiberglass layer on the web to uniformly cover the fiberglass layer with the slurry 46. This is particularly important where thinner slurries are used to cover the fiberglass layer, since thinner slurries have a tendency to drip over wires.

Processing Downstream of the Slurry Feed Apparatus

Referring again to FIG. 2, the other operational components of the Cementitious armor panel production line will be described briefly, but they are described in more detail in the following documents:

U.S. Pat. No. 6,986,812, to Dubey et al. entitled SLURRY FEED APPARATUS FOR FIBER-REINFORCED STRUCTURAL CEMENTITIOUS PANEL PRODUCTION, herein incorporated by reference in its entirety; and the following co-pending, commonly assigned, United States patent applications all herein incorporated by reference in their entirety:

United States Patent Application Publication No. 2005/0064164 A1 to Dubey et al., application Ser. No. 10/666,294, entitled, MULTI-LAYER PROCESS AND APPARATUS FOR PRODUCING HIGH STRENGTH FIBER-REINFORCED STRUCTURAL CEMENTITIOUS PANELS;

United States Patent Application Publication No. 2005/0064055 A1 to Porter, application Ser. No. 10/665,541, entitled EMBEDMENT DEVICE FOR FIBER-ENHANCED SLURRY;

U.S. patent application Ser. No. 11/555,655, entitled METHOD FOR WET MIXING CEMENTITIOUS SLURRY FOR FIBER-REINFORCED STRUCTURAL CEMENT PANELS, filed Nov. 1, 2006;

U.S. patent application Ser. No. 11/555,658, entitled APPARATUS AND METHOD FOR WET MIXING CEMENTITIOUS SLURRY FOR FIBER-REINFORCED STRUCTURAL CEMENT PANELS, filed Nov. 1, 2006;

U.S. patent application Ser. No. 11/555,661, entitled PANEL SMOOTHING PROCESS AND APPARATUS FOR FORMING A SMOOTH CONTINUOUS SURFACE ON FIBER-REINFORCED STRUCTURAL CEMENT PANELS, filed Nov. 1, 2006;

U.S. patent application Ser. No. 11/555,665 entitled WET SLURRY THICKNESS GAUGE AND METHOD FOR USE OF SAME, filed Nov. 1, 2006;

United States Patent Application Publication No. 2007/0110970 A1 to Dubey, application Ser. No. 11/591,793, entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT, filed Nov. 1, 2006;

United States Patent Application Publication No. 2007/0110838 A1 to Porter et al., application Ser. No. 11/591,957, entitled EMBEDMENT ROLL DEVICE, filed Nov. 1, 2006.

Embedment Device

A variety of embedment devices are contemplated, including, but not limited to sheep's foot rollers and the like. However, in the present embodiment the embedment device 70 includes at least a pair of generally parallel shafts 76 mounted transversely to the direction of travel of the carrier web 14 on the frame 12. Each shaft 76 is provided with a plurality of relatively large diameter disks 74 which are axially separated by a distance of about 0.1 to about 0.25 inch (0.25 to 0.63 cm) e.g. 0.15 inch (0.38 cm) from each other on the shaft by small diameter disks (not shown), wherein the longer and smaller disks are located on the same axis.

During cementitious armor panel production, the shafts 76 and the disks 74 rotate together about the longitudinal axis of the shaft 76. As is well known in the art, either one or both of the shafts 76 may be powered. If only one shaft 76 is powered, the other may be driven by belts, chains, gear drives or other known power transmission technologies to maintain a corresponding direction and speed to the driven shaft. The respective disks 74 of the adjacent, preferably parallel shafts 76 overlap and are intermeshed with each other for creating a "kneading" or "massaging" action in the slurry, which embeds the previously deposited fibers 68. In addition, the close, intermeshed and rotating relationship of the disks 74 prevents the buildup of slurry 46 on the disks, and in effect creates a "self-cleaning" action which significantly reduces production line downtime due to premature setting of clumps of slurry.

The intermeshed relationship of the disks 74 on the shafts 76 includes a closely adjacent disposition of opposing peripheries of the small diameter spacer disks (not shown) and the relatively large diameter main disks 74, which also facilitates the self-cleaning action. As the disks 74 rotate relative to each other in close proximity (but preferably in the same direction), it is difficult for particles of slurry to become caught in the apparatus and prematurely set. By providing two sets of disks 74 which are laterally offset relative to each other, the slurry 46 is subjected to multiple acts of disruption, creating a "kneading" action which further embeds the fibers 68 in the slurry 46.

An embodiment of embedment device 70 suitable for use in production line 10 is disclosed in greater detail in co-pending U.S. patent application Ser. No. 10/665,541, filed Sep. 18, 2003, published as US 2005/0064055, and entitled EMBEDMENT DEVICE FOR FIBER-ENHANCED SLURRY, and incorporated herein by reference in its entirety.

Applying Additional Layers

Once the fiber 68 has been embedded, a first layer 77 of the panel 92 is complete. In a preferred embodiment, the height or thickness of the first layer 77 is in the approximate range of 0.25 to 0.27 inches. This range has been found to provide the desired strength and rigidity when combined with like layers in a cementitious armor panel.

To build a structural cementitious panel of desired thickness, additional layers are typically added. To that end, a second slurry feeder 78, substantially identical to the feeder 44, is provided in operational relationship to the moving carrier 14, and is disposed for deposition of an additional layer 80 of the slurry 46 upon the existing layer 77.

Next, an additional chopper 82, substantially identical to the choppers 36 and 66, is provided in operational relationship to the frame 12 to deposit a third layer of fibers 68 provided from a rack (not shown) constructed and disposed relative to the frame 12 in similar fashion to the rack 31. The fibers 68 are deposited upon the slurry layer 80 and are embedded using a second embedment device 86. Similar in construction and arrangement to the embedment device 70, the second embedment device 86 is mounted slightly higher relative to the moving carrier web 14 so that the first layer 77 is not disturbed. In this manner, the second layer 80 of slurry and embedded fibers is created.

Referring now to FIG. 2, with each successive layer of settable slurry and fibers, an additional slurry feeder station 78 followed by a fiber chopper 82 and an embedment device 86 is provided on the production line 10. In the preferred embodiment, two total layers topped by a final slurry layer are provided to form the cementitious armor panel.

A final layer of slurry is deposited over the layer 80 in a third slurry feeder station 78 to produce the final additional layer 88 which is passed through a screed bar 146 to smooth the top surface of the slurry to produce a uniform layer 98 with a nominal thickness of about 0.5 inches, before the slurry is cut to length (typically 8 foot lengths) using cutter blade 98.

An important feature of the present invention is that the panel has multiple layers which will upon setting, form an integral, fiber-reinforced mass. Provided that the presence and placement of fibers in each layer are controlled by and maintained within certain desired parameters as is disclosed and described herein, it will be virtually impossible to delaminate the panel 92 produced by the present process.

Forming and Smoothing and Cutting

Upon the disposition of the two layers of fiber-embedded settable slurry as described above, a forming device such as a screed bar as mentioned above is provided to the frame 12 to shape an upper surface 96 of the panel 92.

However, forming devices which scrape away excess thickness of cementitious armor panel material are not desired. Example of forming devices which are not employed include such as spring-loaded or vibrating plates or vibrating leveling screeds designed to conform the panel to suit desired dimensional characteristics are not used with cementitious armor panel material since they scrape away excess thickness of cementitious armor panel material. Such devices would not effectively scrape away or flatten the panel surface. They would cause the fiberglass to begin to roll up and mar the surface of the panel instead of flattening and smoothing it.

In particular, the production line 10 may include a smoothing device, also termed a screed bar 146, provided to the frame 12 to gently smooth an upper surface 96 of the panel 92. By applying vibration to the slurry 46, the smoothing screed bar 146 facilitates the distribution of the fibers 30, 68 throughout the panel 92, and provides a more uniform upper surface 96.

At this point, the layers of slurry have begun to set, and the respective panels 92 are separated from each other by a cutting device 98, which in a typical embodiment is a water jet cutter. Other cutting devices, including moving blades, are considered suitable for this operation, provided they can create suitably sharp edges in the present panel composition. The cutting device 98 is disposed relative to the line 10 and the frame 12 so that panels are produced having a desired length, typically 8 ft. lengths. Since the speed of the carrier web 14 is relatively slow, the cutting device 98 may be mounted to cut perpendicularly to the direction of travel of the web 14 in 8 ft.

lengths. The panels are then allowed to dry during an 8-72 hour period after the slurry is wet cast i.e. after it leaves the screed bar.

The production line 10 includes sufficient fiber chopping stations 36, 66 slurry feeder stations 44, 78 and embedment devices 70, 86 to produce at least two layers. Additional layers may be created by repetition of stations as described above in relation to the production line 10.

To obtain a cementitious armor panel with both faces or sides smooth, both upper and lower faces of the 4 ft.×8 ft. panels are sanded and are then optionally sawed to a desired size typically from about 2×2 feet up to about 4×8 feet, e.g., 2.5×4 foot panels, for subsequent processing and packaging.

Controlled Rate of Compressive Strength Development

Typically the cementitious composition is cured to achieve a controlled rate of compressive strength development. Desirably achieved is an ultra-high strength cementitious composite material with up to 5-day compressive strength of preferably less than 4000 psi, more preferably less than 3000 psi, and most preferably less than 2000 psi, and 28-day and later age compressive strength in excess of 20,000 psi.

For example some desirable rates of controlled compressive strength development are listed in TABLE 2I.

TABLE 2I

Controlled Rate of Compressive Strength Development

| Rate of Compressive Strength Development | Preference Type |
| --- | --- |
| An ultra-high strength cementitious composite material with 1-day compressive strength of preferably less than 4000 psi, more preferably less than 3000 psi, and most preferably less than 2000 psi, and 28-day and later age compressive strength in excess of 20,000 psi | Preferred |
| An ultra-high strength cementitious composite material with 2-day compressive strength of preferably less than 4000 psi, more preferably less than 3000 psi, and most preferably less than 2000 psi, and 28-day and later age compressive strength in excess of 20,000 psi | More Preferred than the Previous |
| An ultra-high strength cementitious composite material with 3-day compressive strength of preferably less than 4000 psi, more preferably less than 3000 psi, and most preferably less than 2000 psi, and 28-day and later age compressive strength in excess of 20,000 psi | More Preferred than the Previous |
| An ultra-high strength cementitious composite material with 4-day compressive strength of preferably less than 4000 psi, more preferably less than 3000 psi, and most preferably less than 2000 psi, and 28-day and later age compressive strength in excess of 20,000 psi | More Preferred than the Previous |
| An ultra-high strength cementitious composite material with 5-day compressive strength of preferably less than 4000 psi, more preferably less than 3000 psi, and most preferably less than 2000 psi, and 28-day and later age compressive strength in excess of 20,000 psi | Most Preferred |

Applying Skins

After sufficient curing, the cut panels are coated with an adhesive, typically in nip rollers, and then the reinforcing skin is placed on the top surface of the panel and then run through another pair of nip rollers to laminate the skin reinforcing layer to the cementitious core. The panel is then turned and the laminating procedure repeated for the other side of the panel.

In one embodiment, the cementitious panels would be sanded and then the adhesive and fiber reinforced polymer skin layer would applied to the still wet cementitious core and then the cementitious panel with the FRP skin would be would be run under a screed bar or roller.

Embodiments of the Cementitious Armor Panel System of the Invention

Cementitious armor panels may be produced in a variety of sizes, for example, size of 30 in.×48 in. panels with a core thickness of about ½ in. and skins of 0.085 in. thickness. These panels can be rapidly assembled in a frame structure to enable quick deployment as protective enclosures for military or civilian applications. A frame structure with cementitious armor panel cladding of the invention can have an infill in the cavity between the frame such as concrete or sand, designed to assist with the absorption and dissipation of energy when one side of the system is exposed to blast forces or high velocity impact from projectiles. The cementitious armor panels of the invention provide a continuous protective shield that provides for a high mass, thin skin enclosure which is strong, stiff and energy absorbent.

When a frame structure is used to hold the cementitious armor panels, the system can be assembled as a protective enclosure, enabling the panels to deflect and absorb energy while retaining the system shape and maintaining protection around a defined space. The use of a frame with a modular panel enables rapid erection of the panel system.

The frame structure can be configured with the cementitious armor panels being "loose laid" into a track system on the frame structure, as shown in FIG. 23. Based upon the security requirements, multiple layers of cementitious armor panels 200 can be positioned on the frame 210 with "Z clips" 220, as shown in cross-sectional detail in FIG. 20 with the Z clip 220 secured to a frame 210 by a screw 221 and leaving an open channel 222 for receiving and holding one or more cementitious panels 200 on the metal frame structure 210.

Figure 21:
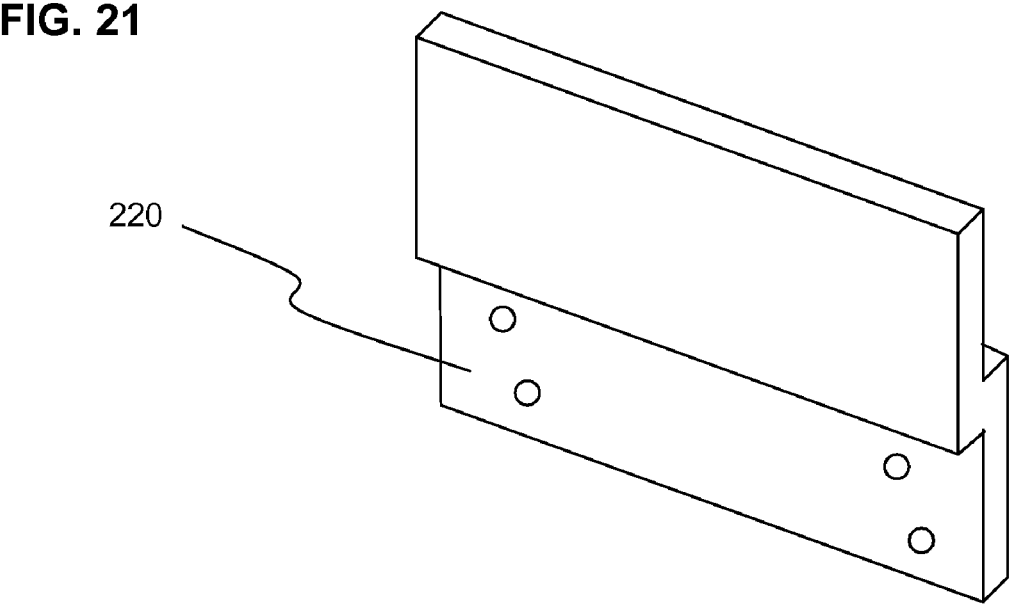
FIG. 21 is another view of a "Z Clip" fastener used to mount cementitious panels in an embodiment of this invention.

FIG. 21 shows a perspective view of the Z-clip (or Z-bar) 220.

Figure 22:
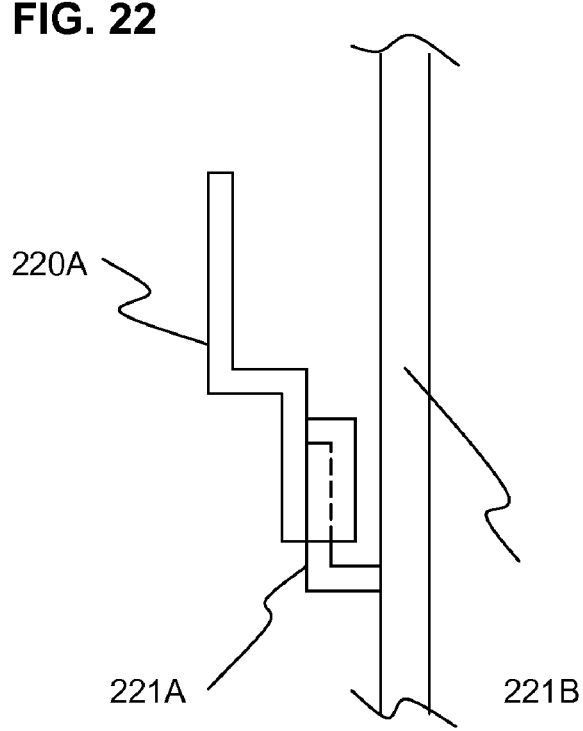
FIG. 22 is another view of a variation of the "Z Clip" fastener used to mount cementitious panels in an embodiment of this invention.

FIG. 22 shows a side view of a second embodiment of the Z-clip 220A having a hollow pocket 220B into which an upstanding protrusion 221A from a frame member 221B can be inserted.

A typical metal frame shown in FIG. 23 can be a metal easel shaped frame 210 having cross structural supports. Alternatively, "H" or "C" shaped clips can also be used to be attached to the frame on one side and leaving an open channel for receiving one or more cementitious panels without requiring screw attachments to the cementitious armor panels. This type of system can be deployed rapidly with very little equipment. The system can be used for perimeter protection in military applications, such as temporary checkpoints, remote bases and for protection of equipment like aircraft and mechanical equipment.

The height "B" of the frame structure 210 with cementitious armor panels in place can vary from approximately 6 ft. to 20 ft. The width of the frame structure "A" at the base of the frame with cementitious armor panels in place can vary from 4-10 ft and the width at the top "C" of the frame can typically vary from 2-6 ft. The height and width of the frame structure with cementitious armor panels in place will be dependent upon the security enclosure needs and the available area for erection of the frame.

A benefit of the use of a loose laid structure for the cementitious armor panels is the ability of the panels to move in the track and absorb greater ballistic and blast loads without being secured in place to a frame structure.

Figure 25:
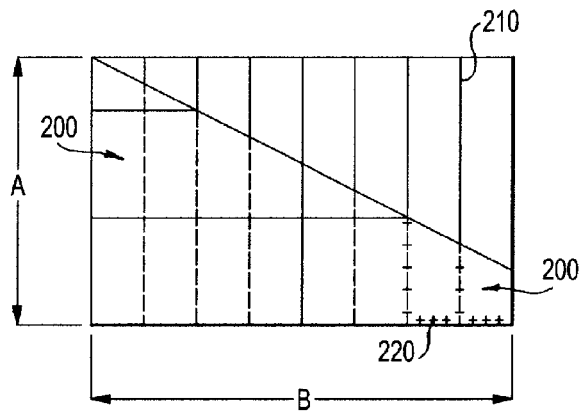
FIG. 25 is a side view of a system with cementitious armor panels fastened to a metal frame structure.
Figure 26:
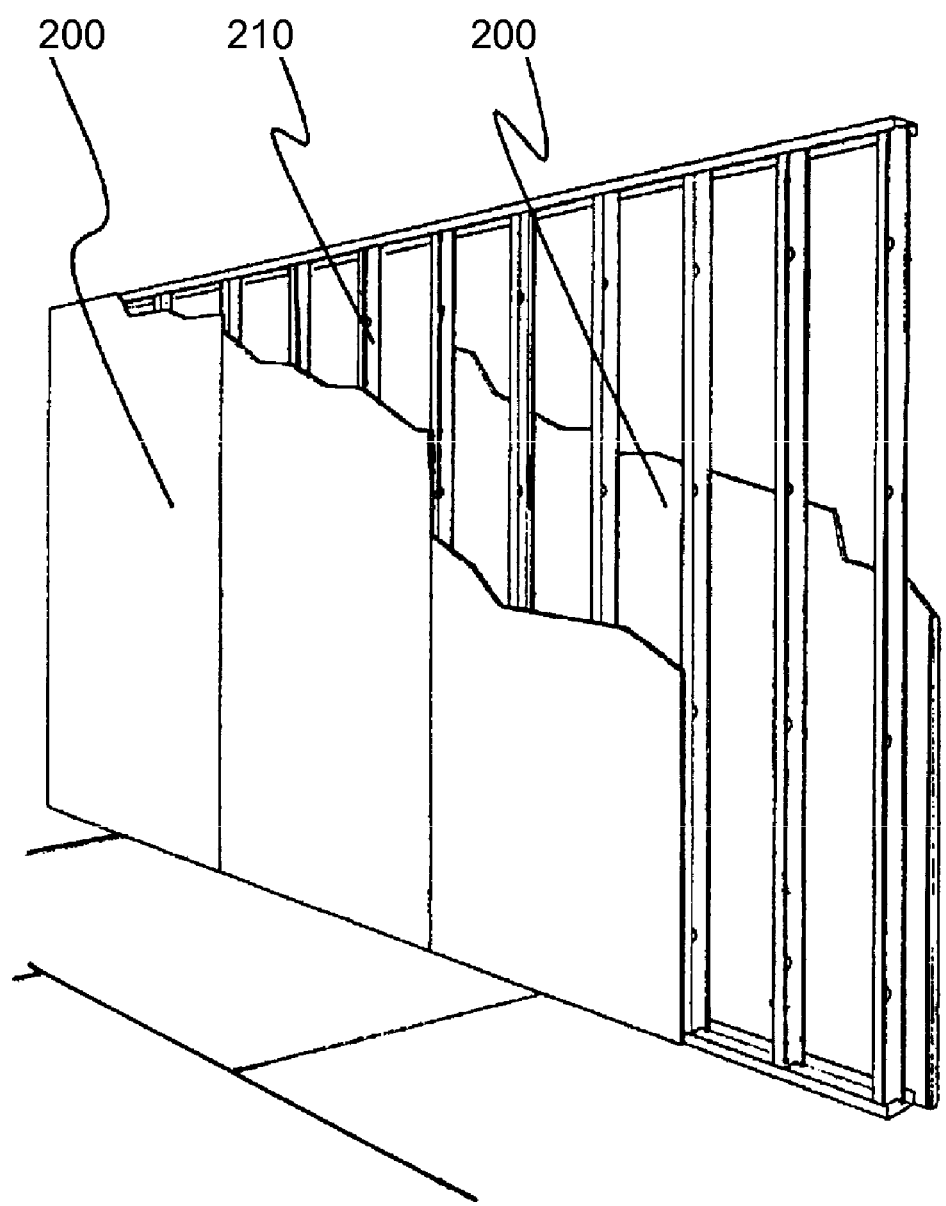
FIG. 26 is another side view of a metal frame wall structure with cementitious panels attached to each side of the metal frame.

In another embodiment, the frame structure can be configured as a vertical wall assembly, with the panels 200 attached to a vertical frame using mechanical fasteners 220 which are fastened to the frame and/or adhesive attachment with adhesives such as an epoxy, as shown in the embodiments in FIGS. 24, 25 and 26. In these embodiments, the cementitious armor panel can be pre-drilled using conventional tools such as hammer-drill to provide a pilot hole for attached a mechanical fastener to the cementitious armor panel 200 and to the frame structure 210. In this application, the panel may be larger than 30 in.×48 in., with a typical module for building construction being 48 in.×96 in.

The height of the frame wall structure with cementitious armor panels 200 fastened to the frame as shown in FIG. 26, can typically vary from about 4 ft. to 20 ft. with a depth of the frame structure with panels in place typically varying from 6 in to 24 in. The depth can be increased from 24 in. if required to protect against more severe security threats. The height and depth of the wall frame wall structure with cementitious armor panels 200 in place will depend upon the security enclosure required and the available area for erection of the frame.

The wall configuration shown in FIG. 25, can have a length of wall "B" ranging from 2 ft to 100 ft. and a height "A" of 4 ft. to 20 ft. The configuration of the frame, which can also be used for flooring structures, can be used in permanent structures for security in buildings and industrial and transportation facilities in security sensitive areas, and the cementitious armor panels provide structural support for the structure and can be used to provide support for shear loads.

Figure 27:
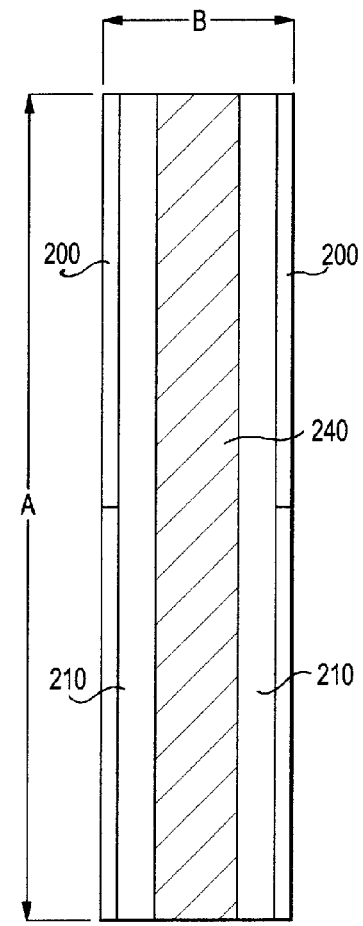
FIG. 27 is a side view of a panel system of the invention with cementitious armor panels fastened to the outer sides of a metal frame structure with infill material placed within the cavity between the metal frame members.
Figure 28:
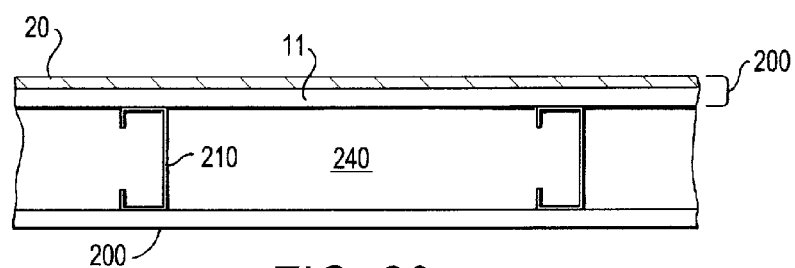
FIG. 28 is top view of a panel system of the invention with cementitious armor panels with a reinforced skin laminated on the exterior surface of the cementitious panel and cementitious panels fastened to both sides of a metal frame structure with infill material placed within the cavity between the metal frame members.

The frame structure with cementitious armor panel cladding can also be combined with an infill material of concrete, cellular concrete, sand, light weight aggregate in the frame wall cavity to provide additional blast and security protection. FIGS. 27-28 show alternative frame structures with cementitious armor panels 200 comprising a cementitious core 11 and laminated fiber reinforced skin layer 20 (FIG. 28) on at least one surface attached to both surfaces of the frame 210 to form a wall structure having infill material 250, such as cellular concrete, in the framing cavity between frames 210.

The panel assembly of cementitious armor panels 200 on metal frames 210 with infill 240 in FIG. 27 can typically have a height "A" of 6-20 ft. and a width "B" of 6-48 inches.

In another embodiment, the cementitious armor panels can be attached to the outer surface of an existing structure such as a masonry or concrete wall as an outer wall or cap structure to provide added ballistic and blast resistance. The cementitious armor panel can be mechanically attached to the wall by the use of furring channels in the existing wall for attachment of mechanical fasteners pre-drilled in the cementitious armor panel. Alternatively, the panel with the skin layer on the outer facing surface can be adhesively attached to the wall or be applied oven a layer of mortar which can be applied to the existing wall structure by trowel.

The cementitious armor panel system of the present invention provides security and blast resistance for such applications as blast resistance perimeter enclosure, forced entry protection, "Jersey barrier" type traffic control entry protection, pedestrian walkway and traffic flow control and building entry and exit access protection.

The reinforced skin layer can be applied to one or both surfaces of the cementitious panel. The skin layer provides a number of improved features to the cementitious panel including providing improved flexural and tensile strength to the panel. The skin layer also confines the cementitious core to prevent fragmentation of the cementitious core when it is subject to ballistic or blast impact forces. The reinforced skin provides added toughness to the cementitious core panel when applied on one or more surfaces and serves to absorb more energy than an unfaced cementitious panel. It has also been found cementitious armor panels with reinforced skin such as laminated FRP layers can sustain multiple impacts without destroying the integrity of the cementitious panel.

Another advantage of the use of laminated FRP layers on both surfaces of the cementitious panel is that the FRP laminate surface are more durable than cementitious armor panels that do not have a fiber reinforced skin layer and these faced panel can be easily cleaned and maintained compared to cementitious panels without facing layers.

Typical Uses of the Invention

Select embodiments of the present invention are suitable for fabricating inexpensive structural panels, such as thin concrete armor panels that may be used for vehicles as well as fixed structures. Structural armor panels may be formed or extruded to a thickness heretofore impractical because of the improved toughness and strength of embodiments of the present invention. For example, panels may be produced in size and thickness to accommodate man-portability. These man-portable panels may be configured for attaching to a structural framework to resist penetration of small arms fire and mitigate blast and fragmentation effects.

Military forces use a variety of protective materials ranging from soil cover to expensive, high-performance, lightweight ballistic ceramics. An embodiment of the present invention, configured appropriately, offers an inexpensive solution for force protection in addition to man-portable products. Applications for embodiments of the present invention include but are not limited to the military and government applications: very high performance concrete incorporated in inexpensive ballistic armor; light weight structural shapes such as plates, channels, pipes, tubes, I- and WF-sections; connectors; protective construction; blast-resistant panels; fragmenting munitions protection; vehicle up-armoring; forced entry resistant structural elements and the like.

In military applications, the system can provide rapid installation for temporary military installations for checkpoints, remote bases, camp protection and protection of military equipment and hardware. In more permanent applications, the panel system provides protection for base perimeters, base entries, base structure protection and aircraft enclosures.

For commercial users: building construction products, such as roofing tiles, wall panels, floor tiles, and the like; lightweight structural shapes such as plates, channels, pipes, tubes, I- and WF-sections; hurricane and tornado resistant structural elements, forced entry resistant structural elements, In civilian and commercial applications, the cementitious armor panel system can provide protection for transportation facilities like airports, shipyards, roads, train stations and mass transit facilities. The panel system can also be used to protect hospitals, chemical, energy and industrial facilities, as well as schools, embassies and government installations.

Wall system assemblies of the present invention made from the cementitious armor panels have shear values similar to the shear values obtained with systems made with structural cementitious panels that are mechanically fastened to frames such as metal frames, as shown in the co-pending U.S. application Ser. No. 11/321,069 filed Dec. 30, 2005 of Tonyan et al, for Non-Combustible Reinforced Cementitious Lightweight Panels and Metal Frame System for Shear Walls, which is incorporated herein by reference in its entirety.

The shear strength of the wall systems of this invention made with CEMENTITIOUS ARMOR panels is dependent upon the mechanical fasteners used and the spacing of the fasteners on the frame structure. The racking strength of the CEMENTITIOUS ARMOR panels on the assembly and the blast resistant properties of the CEMENTITIOUS ARMOR PANEL assembly are also dependent upon the shear values which in turn are dependent upon the number of fasteners used per unit area of the CEMENTITIOUS ARMOR panels (size of the panels) used on the frame.

Uses of the Cementitious Material

Select embodiments of the present invention are suitable for fabricating inexpensive structural panels, such as thin concrete armor panels that may be used for vehicles as well as fixed structures. Structural armor panels may be formed or extruded to a thickness heretofore impractical because of the improved toughness and strength of embodiments of the present invention. For example, panels may be produced in size and thickness to accommodate man-portability. These man-portable panels may be configured for attaching to a structural framework to resist penetration of small arms fire and mitigate blast and fragmentation effects.

Military forces use a variety of protective materials ranging from soil cover to expensive, high-performance, lightweight ballistic ceramics. An embodiment of the present invention, configured appropriately, offers an inexpensive solution for force protection in addition to man-portable products. Applications for embodiments of the present invention include but are not limited to, for the military and government applications: very high performance concrete incorporated in inexpensive ballistic armor; light weight structural shapes such as plates, channels, pipes, tubes, I- and WF-sections; connectors; protective construction; blast-resistant panels; fragmenting munitions protection; vehicle up-armoring; forced entry resistant structural elements and the like.

For commercial users: building construction products, such as roofing tiles, wall panels, floor tiles, and the like; lightweight structural shapes such as plates, channels, pipes, tubes, I- and WF-sections; hurricane and tornado resistant structural elements, forced entry resistant structural elements, and the like.

EXAMPLES

The flow properties and self-leveling behavior of the cementitious compositions of this invention were characterized using the slump test. The slump test used in the following experiments utilizes a hollow cylinder 5.08 cm. (2 inches) in diameter and 10.16 cm. (4 in.) in length kept vertically on a smooth plastic surface. The cylinder is filled up to the top with the cementitious mixture followed by striking off the top surface to remove the excess slurry mixture. The cylinder is then gently lifted up vertically to allow the slurry to come out from the bottom and spread on the plastic surface to form a circular patty. The diameter of the patty is then measured and recorded as the slump of the material. Compositions with good flow behavior yield a larger slump value.

To make use of conventional, high-efficiency manufacturing methods for producing cement-based products, it is desirable that the cementitious slurries with a slump value of less than 12.7 cm (5 in.) since slurries with slump values greater than 12.7 cm (5.0 in.) are extremely difficult to handle and process using the conventional manufacturing methods.

The influence of various raw material variables on the flow properties and self-leveling behavior was determined using the slump test in the examples described below.

Example 1

Slump was measured by pouring slurry into a 2 inch diameter cylinder that is 4 inches tall (open on each end and placed on end on a flat smooth surface) and screeding the top of the slurry off. This provides a set volume of slurry for every test. Then the cylinder was immediately lifted and the slurry rushed out the open bottom end of the cylinder. This act formed a circular "patty" of slurry. The diameter of this patty is measured in inches and recorded. More fluid slurry will typically result in a larger diameter patty.

TABLE 3 shows the influence of silica sand content as the inorganic mineral filler on slump of the cementitious mixtures. The other raw materials in the various mixtures were held constant. As the results show, the slump of the cementitious mixtures decreases with an increase in the silica sand content in the mixture.

Typical formulations for the mixtures in TABLE 3 through 7 are shown in the above discussed TABLE 1.

TABLE 3

| Mixture | Inorganic Mineral Filler Content as Silica Sand* | Slump Inches (cm) |
| --- | --- | --- |
| Mix 1 | 1.82 | 3 in. (7.6 cm) |
| Mix 2 | 1.35 | 5 in. (12.7 cm) |
| Mix 3 | 0.85 | 7 in. (17.8 cm) |

*Silica sand content expressed as a weight ratio with respect to the total cementitious materials, where the inorganic cementitious binder (Portland cement) and pozzolanic micro filler (silica fume) are considered as cementitious materials in the composition. For example, for Mix 1, 1.82 parts by weight of silica sand is present for each 1 part by weight of combined inorganic cementitious binder and pozzolanic filler.

Example 2

TABLE 4 shows the influence of the particle size of silica sand on slump of the cementitious mixtures. Two types of silica sand were used, the first with a median particle size of about 200 microns and the second with a median particle size of about 10 microns. The other raw materials were maintained constant. As shown in the table, the slump of the cementitious mixtures decreased significantly with the use of finer silica sand in the composition.

TABLE 4

| Mixture | Inorganic Mineral Filler Type | Slump in inches (cm) |
| --- | --- | --- |
| Mix 4 | Coarse Silica Sand with 200 microns median particle size[1] | 7 in. (17.8 cm) |
| Mix 5 | Fine Silica Sand with 10 microns median particle size[2] | 2 in. (5.1 cm) |

[1]Coarse silica sand - US Silica F-55 unground silica
[2]Fine silica sand - US Silica MIN-U-SIL 40 ground silica

Example 3

TABLE 5 shows the influence of silica fume pozzolanic micro filler content on the slump of the cementitious mixture with all other raw materials maintained constant. It can be observed that the slump of the cementitious mixtures decreases with an increase in the content of silica fume in the mixture.

TABLE 5

| Mixture | Silica Fume Content[1] | Slump in inches (cm) |
| --- | --- | --- |
| Mix 6 | 15% | 9.5 in. (22.8) |
| Mix 7 | 25% | 6 in. (15.2) |
| Mix 8 | 35% | 3 in. (7.6) |

[1]Silica Fume content expressed as a weight % of total cementitious materials, where Portland cement and Silica sand are considered as cementitious materials in the mixture. For example, Mix 6 contains 15 parts by weight silica fume and 85 parts by weight combined portland cement and silica sand.

Example 4

TABLE 6 shows the influence of self-leveling agent on slump of the cementitious mixture. Two types of chemical admixtures were used, polycarboxylate and polynapthalene-sulfonate chemistry based compounds, with the others materials remaining constant. The slump of the mixture containing polycarboxylate chemistry based admixtures was significantly higher than the mixtures containing the polynapthalene-sulfonate based additive.

TABLE 6

| Mixture | Self-leveling Agent (wt. % of total portland cement and silica fume) | Self-leveling Agent Content (wt. % of total portland cement and silica fume) | Slump in inches (cm) |
|---|---|---|---|
| Mix 9 | Adva ® Cast polycarboxylate (W.R. Grace, Columbia, MD) | 3.0 | 6.75 in. (17.1) |
| Mix 10 | DILOFLO GW 40[2] Polynapthalene-Sulfonate (Geo Specialty Chemicals, Horsham, PA 19044) | 3.0 | 3.0 in. (7.6) |

For example, for Mix 9, 3.0 parts by weight of self-leveling agent is present for each 100 parts by weight total portland cement and silica fume.

Example 5

TABLE 7 shows the influence of the content of polycarboxylate self-leveling agent content on the slump values for mixtures that are otherwise the same. It can be seen that the slump increase with the increase of the amount of agent used in the mixture.

TABLE 7

| Mixture | Content of Adva Cast ® polycarboxylate (wt. % of total portland cement and silica fume) | Slump in inches (cm) |
|---|---|---|
| Mix 11 | 1.0 | 3.0 (7.6) |
| Mix 12 | 2.0 | 6.75 in (17.1) |
| Mix 13 | 3.0 | 9.0 in (22.9) |

Example 6

TABLE 8 shows the compressive strength of the self-leveling cementitious compositions of the invention. It can be observed that these mixtures yield ultra-high compressive strengths, typically in excess of 20,000 psi.

Slump was measured by filling a 4 in. tall by 2 in. diameter brass cylinder with the mixture, screeding the top edge of the cylinder to remove excess material, vertically lifting the cylinder within 5 seconds to allow the slurry to spread out and measuring the diameter of the formed slurry patty. Compressive strength was determined on 2 in. cubes in accordance with the test method in ASTM C 109. Slump loss and compressive strength gain were measured over a period of up to 7 hours and up to 7 days, respectively. The compressive strength of these mixtures was also evaluated under accelerated curing conditions with 7-day old samples being submerged in water at 140° F. (60° C.) followed by 4 days drying in a ventilated oven at 175° F. (79.4° C.) followed by cooling and testing

TABLE 8

| Ingredient | Results | Mix 14 Jun. 17, 2005 (wt %) | Mix 15 Jan. 24, 2006 (wt %) | Mix 16 Mar. 10, 2006 (wt %) | Mix 17 Apr. 04, 2006 (wt %) |
|---|---|---|---|---|---|
| Portland Cement Type 1 Inorganic Cementitious Binder | | 37.0 | 37.6 | 37.0 | 37.0 |
| Silica Fume Pozzolanic micro filler | | 6.5 | 6.6 | 6.5 | 6.5 |
| Silica Sand[1] (coarse silica sand-US Silica F-55 unground silica) inorganic mineral filler | | 45.7 | 46.5 | 45.7 | 45.7 |
| Polycarboxylate polyether Adva Cast 500 ® self leveling chemical agent | | 2.2 | 2.2 | 1.5 | 1.3 |
| Water | | 8.7 | 7.1 | 9.3 | 9.6 |
| | Slump inches (cm) | 8.0 | 8.0 | 8.0 | 8.0 |
| | Compressive Strength in psi (MPa) | 20990 (144.7 MPa) | 20119 (138.7 MPa) | 20963 (144.5 MPa) | 21026 (145 MPa) |

Example 7

Fiber reinforced cement-based panels were manufactured using the self-leveling cementitious composition of the invention with alkali-resistant glass fibers using a Spray-up method.

In the Spray-up method, the slurry may be combined with the glass fibers in several ways, with the objective of obtaining a uniform mixture. The glass fibers typically will be in the form of rovings that are chopped into short lengths. In a preferred embodiment, the slurry and chopped glass fibers are concurrently sprayed into a panel mold. Preferably, spraying is done in a number of passes to produce thin layers, preferably up to about 0.25 inches thick, which are built up into a uniform panel having no particular pattern and with a thickness of ¼ to 1 inch. For example, in one application, a 3×5 ft. panel was made with six passes of the spray in the length and width directions. As each layer is deposited, a roller may be used to assure that the slurry and the glass fibers achieve intimate contact. The layers may be leveled with a screed bar or other suitable means after the rolling step.

Typically, compressed air will be used to atomize the slurry. As it emerges from the spray nozzle, the slurry mixes with glass fibers that have been cut from a roving by chopper mechanism mounted on the spray gun. The uniform mixture of slurry and glass fibers is deposited in the panel mold as described above.

The nominal thickness of the manufactured panels was ½ inch and the volume fraction of glass fibers in the panels was 3%. TABLE 9 shows the flexural performance of the fiber-reinforced, self-leveling, ultra-high strength cementitious compositions. The formulation of TABLE 9 is Mix 17 of TABLE 8. The modulus of elasticity of the panels exceeded 5000 ksi, which is almost twice the modulus of elasticity of the full density normal strength concrete material. The flexural strength of the fiber reinforced panels was in excess of 3000 psi. The ASTM C1325 test method was used for modulus and the ASTM C947 test method was used for flexural strength.

TABLE 9

| Ingredients | Formulation Mix (Wt. %) | Test | Results |
|---|---|---|---|
| Portland Cement Type 1 | 37.0 | | |
| Silica Fume | 6.5 | | |
| Silica Sand (coarse silica sand- US Silica F-55 unground silica) | 45.7 | | |
| Adva Cast 500 ® Polycarboxylate Leveling Agent | 1.3 | | |
| Water | 9.6 | | |
| | | Modulus of Elasticity (ksi) | 5140 ksi |
| | | Flexural Strength (psi) | 3105 psi |

Examples with Triethanolamine (TEA) and Tartaric Acid

The following examples are provided to illustrate the benefits of using admixtures of a preferred alkanolamine, triethanolamine and a preferred acid, tartaric acid at appropriate dosages. All mixtures contain Portland cement and silica fume as cementing components at a relative weight ratio of 0.85 to 0.15 and silica sand as filler at a weight ratio of 1.05 to 1.00 relative to the cementing components. Water was used at a weight ratio of 0.22 to 1.00 relative to the cementing components. The specified chemical admixtures of a carboxylated polyether superplasticizer, triethanolamine (TEA 99 Low Free Grade (LFG) 85% TEA and 15% water) and tartaric acid were added in the amounts listed in the following examples to control mixture fluidity, set time and strength gain.

All of the ingredients were pre-conditioned in sealed plastic bags at 75-80° F. for at least 24 hours prior to mixing in a Hobart mixer at high speed to achieve uniform dispersion. The temperature rise in the mixtures was measured by use of thermocouples embedded into 350 g. samples of each mixture and connected to a data acquisition system. Initial and final set times were determined using Gilmore needles in accordance with the method in ASTM C 266.

Slump and compressive strength were determined in accordance with the test methods described above in Example 6.

Example 8

Three mixes were prepared in accordance with the above procedure using the superplasticizer at 3% by weight of the cementing components to control mix fluidity and tartaric acid at levels of 0% (control), 0.15% and 0.30% by weight of the cementing components. No TEA was added to the sample mixes. The slump of the mixes was determined to be 7.5 in. (19.1 cm) for the control, 10.3 in. (26.2 cm) for the mix containing 0.15% tartaric acid and 10.8 in. (27.4 cm) for the mix containing 0.30% tartaric acid.

Figure 3:
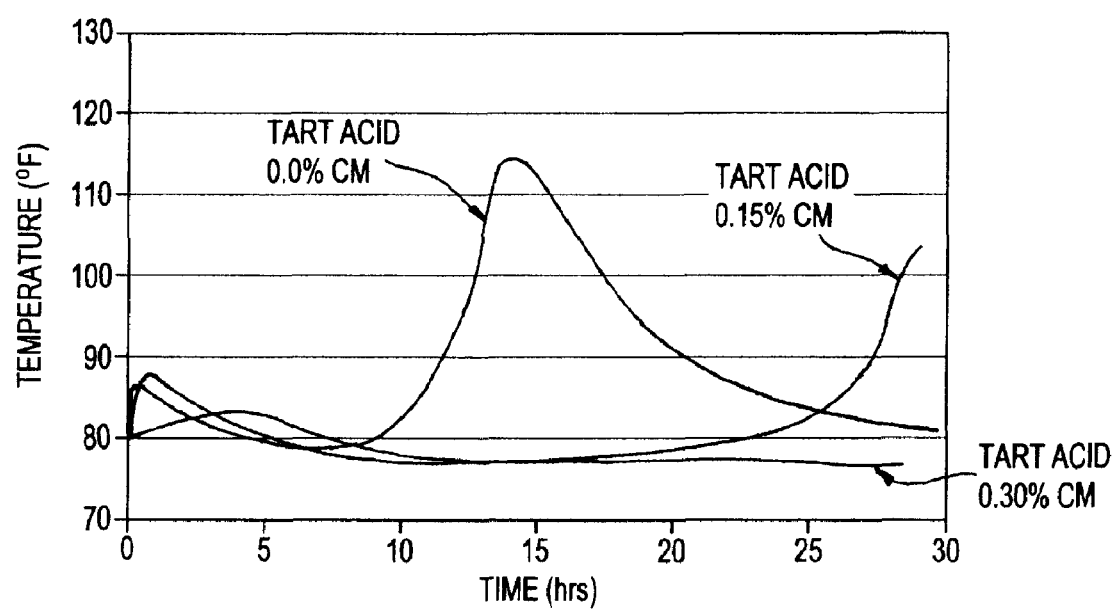
FIG. 3 is a graph of temperature rise for mixes from Example 8 containing varying amounts of tartaric acid.

FIG. 3 shows the temperature rise behavior of the mixes during the first 30 hours after casting. FIG. 3 shows the mixes with added tartaric acid did not exhibit setting during the first 24 hours compared to the control mix which set in about 10 hours.

Figure 4:
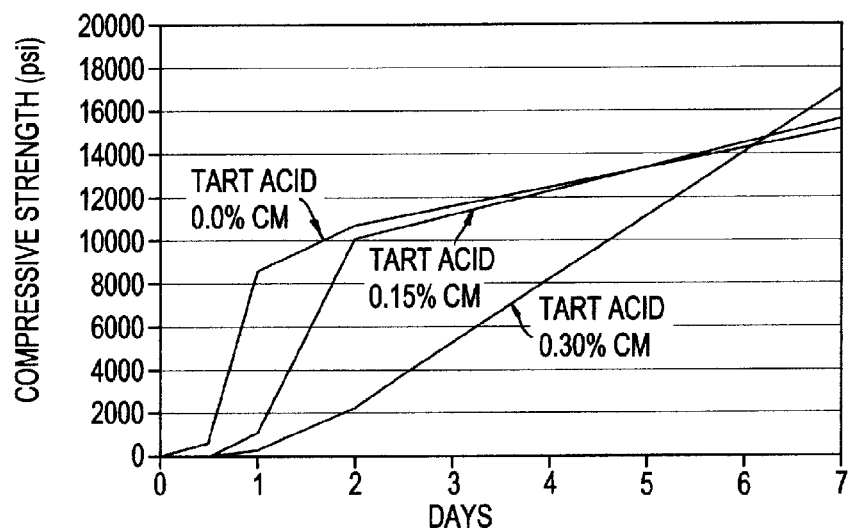
FIG. 4 is a graph of compressive strength gain for mixes of Example 8 containing varying amounts of tartaric acid.

FIG. 4 shows the compressive strength gains for up to 7 days. FIG. 4 shows the mixes with tartaric acid had a slower rate of compression strength gain in the first several days after mixing compared to the control, but at 7 days, the 0.15% and 0.30% tartaric acid mixes achieve higher strengths (19346 psi and 23759 psi, respectively) compared to the control (19065 psi).

Example 9

Figure 5:
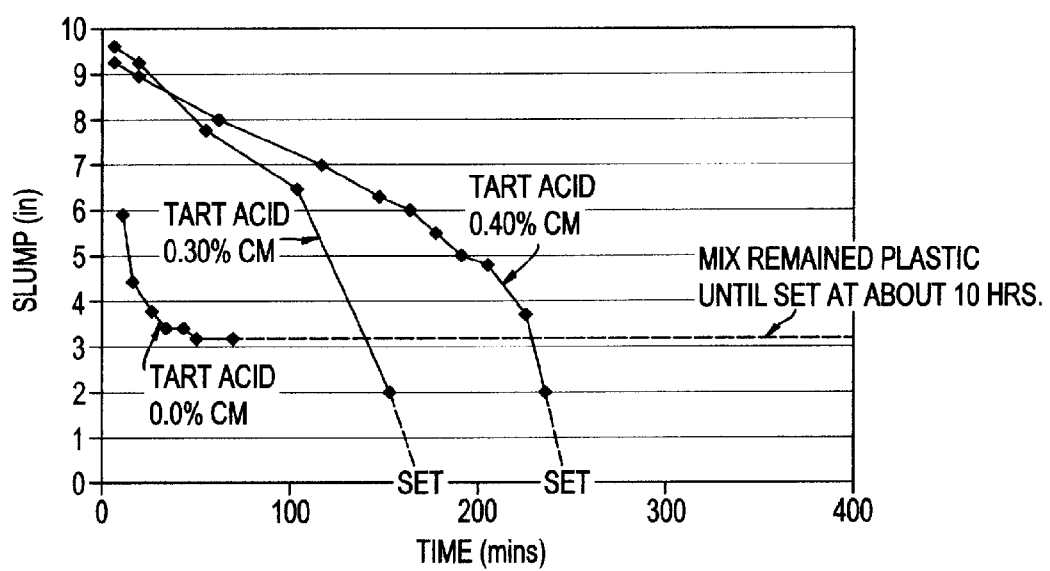
FIG. 5 is a graph of slump loss for mixes of Example 9 containing varying amounts of tartaric acid and constant amounts of superplasticizer and triethanolamine.

In this example, the combined effects of addition of both tartaric acid and TEA were evaluated. All of the mixes contained cementing components, water and superplasticizer in the proportions in Example 8 and TEA was added to all mixes at 0.045% by weight of the Portland cement. Tartaric acid was at 0%, 0.30% and 0.40% by weight of the cementing components. The slump of the mixes was measured to be 5.9 inches (15.0 cm), 9.9 in. (25.1 cm), and 9.3 inches (23.6 cm) for the control and the 0.30% and 0.40% tartaric acid samples, respectively. The slump loss for these mixes was measured and is shown in FIG. 5. FIG. 5 shows the addition of tartaric acid to the TEA resulted in extended fluidity of the mix over 2-3 additional hours, followed by a sharp drop in fluidity at around 2 hours for the 0.30% tartaric acid mix and 3 to 3.5 hours for the 0.40% tartaric acid mix, followed by setting.

This extended period of workability compared to the control allows sufficient time for panels to be formed and cut in a forming line, while setting immediately after slump loss of 3-4 hours allows for transportation and handling of the panels after forming without sagging. The mix without tartaric acid experienced rapid slump loss within the first half hour after mixing and remained in a thick plastic state until it set at around 10-11 hours.

Figure 6:
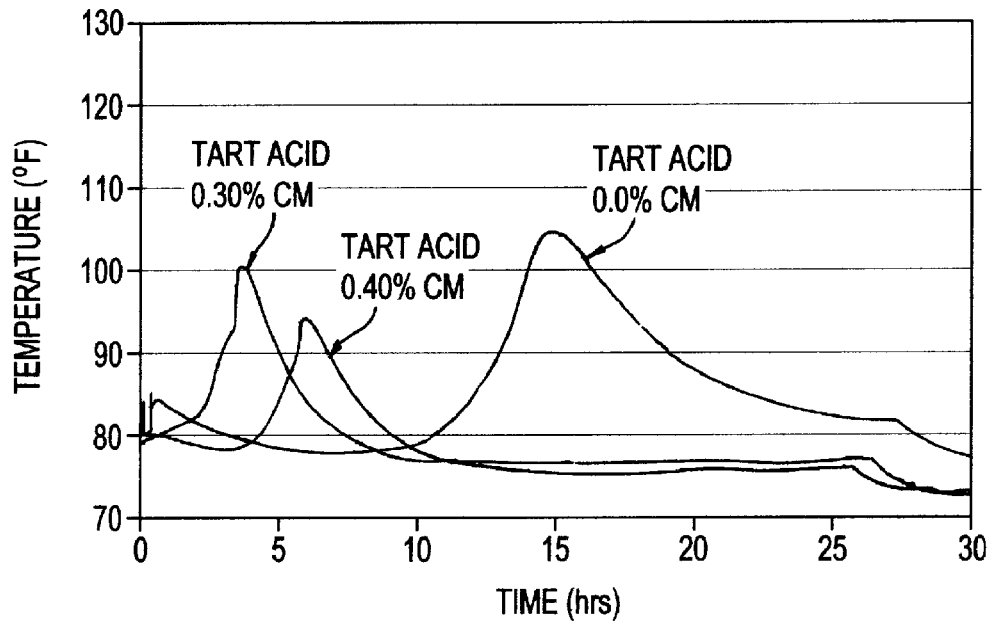
FIG. 6 is a graph of temperature rise behavior for mixes of Example 9 containing varying amounts of tartaric acid and constant amounts of superplasticizer and triethanolamine.

FIG. 6 shows the temperature rise behavior of the three mixes in the first 30 hours after casting. This shows the relatively faster set of the mixes containing tartaric acid.

Figure 7:
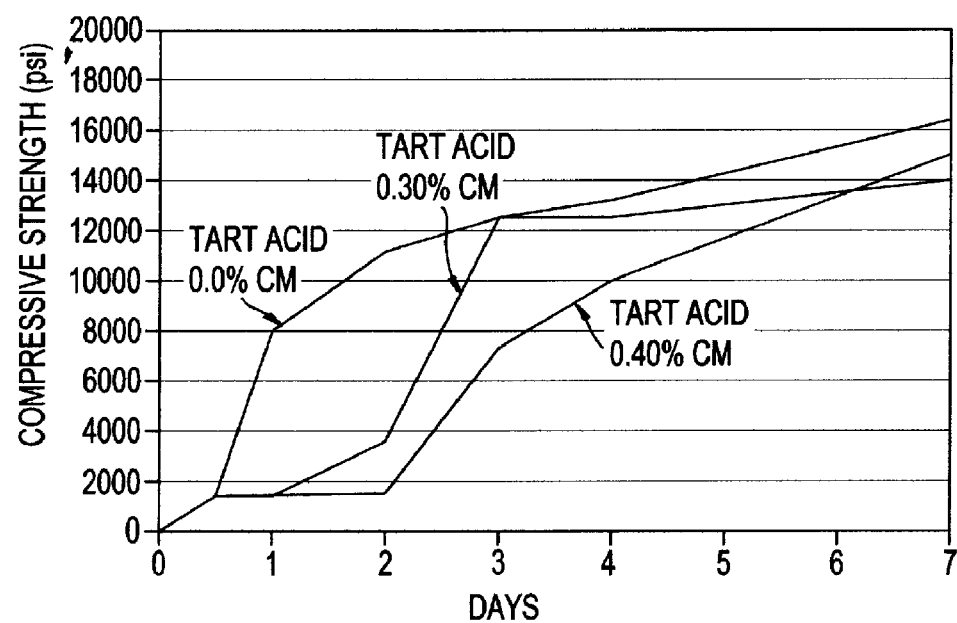
FIG. 7 is a graph of compressive strength gain for mixes of Example 9 containing varying amounts of tartaric acid and constant amounts of superplasticizer and triethanolamine.

FIG. 7 shows compressive strength gain of the tested mixes over the first 2-3 days after mixing. The tartaric acid mixes exhibited slower strength gains, which allows more time for finishing the panels. At 7 days, both tartaric acid mixes attained about 10% higher strength than the control mix. The accelerated strength for the 0%, 0.30% and 0.40% tartaric acid mixes was 22549, 22847 and 20418 psi, respectively.

Example 10

Mixes were prepared using cement components and water in proportions similar to those in Examples 8 and 9. Tartaric acid was added at 0.40% by weight of cementing components and TEA was added at 0.045% by weight of Portland cement. The amount of superplasticizer (SP) was varied at 1%, 2% and 3% by weight of the cementing components. The resulting slump of the mixes was 8.8 in. (22.4 cm), 9 inches (22.9 cm), and 10.3 inches (26.2 cm), respectively for the 1%, 2% and 3% SP mixes. For proper workability of the slurry, slump is preferably in the range of 5-7 inches (12.7-17.8 cm). Thus the level of SP can be reduced to 1%, i.e. only one-third its originally amount in the other composition embodiments when tartaric acid is added to the mix in the test amounts.

Figure 8:
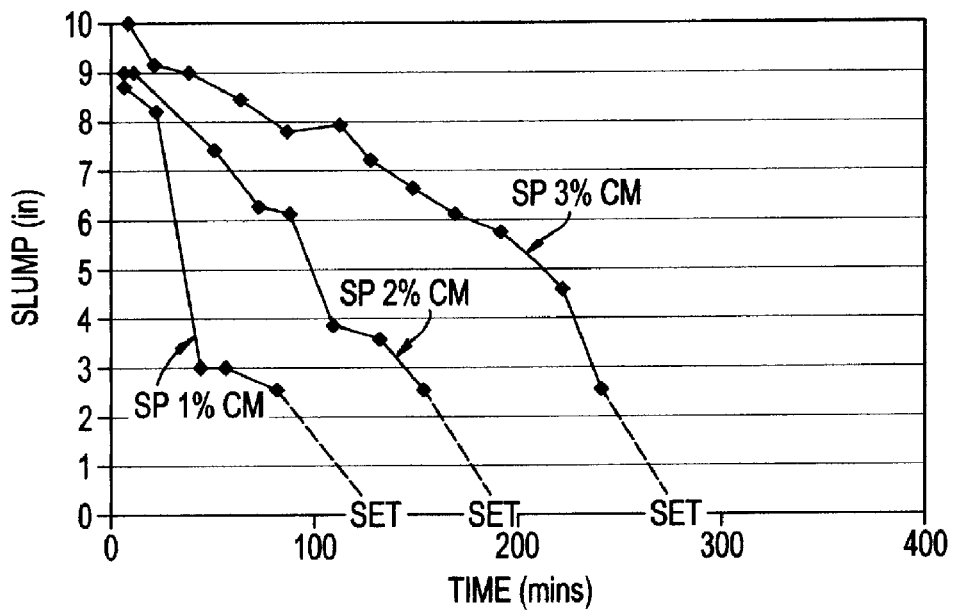
FIG. 8 is a graph of slump loss for mixes of Example 10 containing varying amounts of superplasticizer at constant amounts of TEA and tartaric acid.

FIG. 8 shows the slump losses for the mixes. The mix with 1% SP maintained its fluidity for about 20 min., followed by a rapid drop in slump and eventual set at around 2.5 hours. The mixes containing more SP maintained fluidity for a longer period, but their slump also rapidly dropped followed by setting of the mix.

Figure 9:
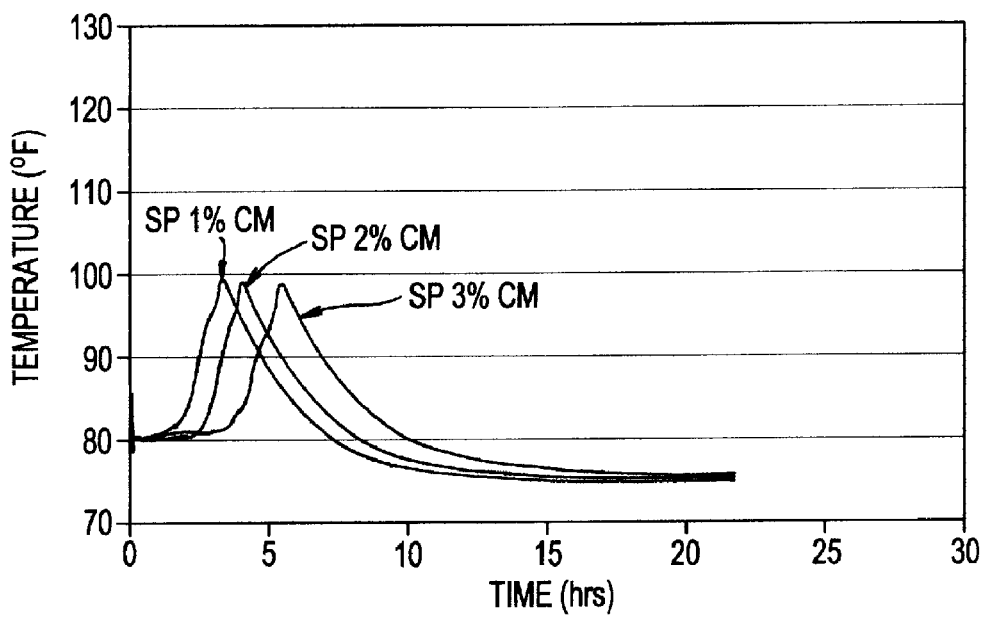
FIG. 9 is a graph of temperature rise behavior for mixes of Example 10 containing varying amounts of superplasticizer at constant amounts of TEA and tartaric acid.

FIG. 9 shows the temperature behavior of these mixes during the first 30 hours after casting, with retardation of temperature increasing with higher levels of SP.

Figure 10:
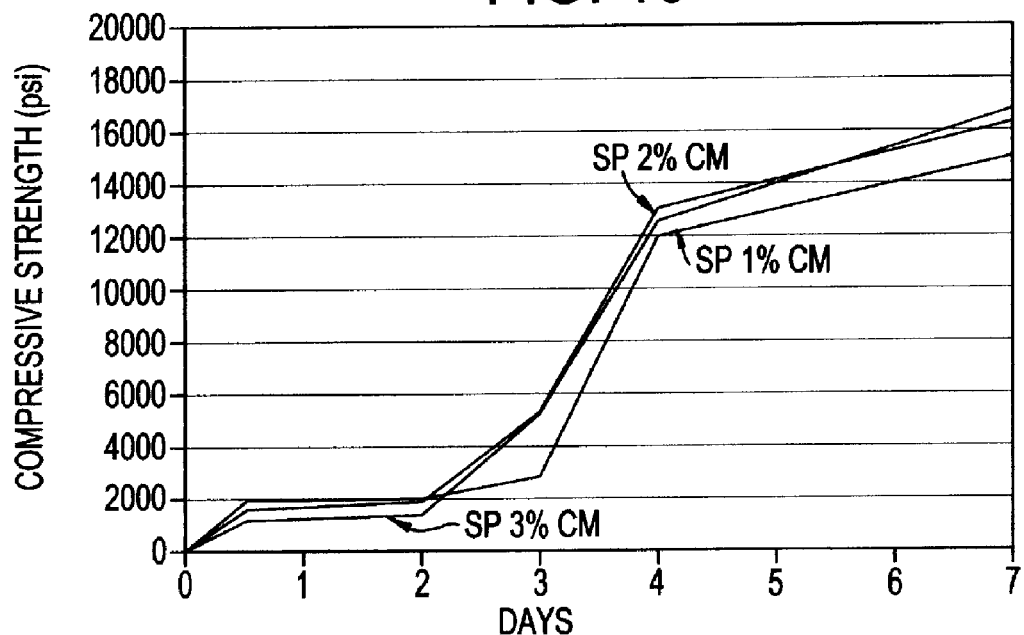
FIG. 10 is a graph of compressive strength gain for mixes of Example 10 containing varying amounts of superplasticizer at constant amounts of TEA and tartaric acid.

FIG. 10 shows compressive strength gain of these mixes, with no measurable difference noted among the mixes. The accelerated strength was 26145 psi, 25714 psi and 19096 psi respectively, for the 1%, 2% and 3% SP mixes.

An ultra-high strength cementitious composite material with 1-day compressive strength of preferably less than 4000 psi, more preferably less than 3000 psi, and most preferably less than 2000 psi, and 28-day and later age compressive strength in excess of 20,000 psi to 30,000 psi meets the requirements for rate of controlled compressive strength gain, and with a most preferred rate of controlled compressive strength gain wherein the cementitious composite materials has with up to 5-days with compressive strength of less than 4000 psi and most preferably less than 2000 psi after 5 days and a 28-day and later age compressive strength of at least 10,000 psi and preferably in excess of 15,000 psi, more preferably in excess of 20,000 psi and more preferably in excess of 25,000 to 30,000 psi.

Example 11

Mixes containing cementing components and water in proportions similar to described in Examples 8-10 were made with 1.5% by weight SP based upon the weight of cementing components and TEA at a level of 0.045% by weight of Portland cement. Tartaric acid content was varied at 0.40%, 0.80% and 2.0% by weight of the cementing component. The slump of the mixes was measured as 8.8 inches (22.4 cm), 8.9 inches (22.6 cm), and 7.8 inches (19.8 cm) for the 0.40%, 0.80% and 2.0% tartaric acid mixes, respectively.

Figure 11:
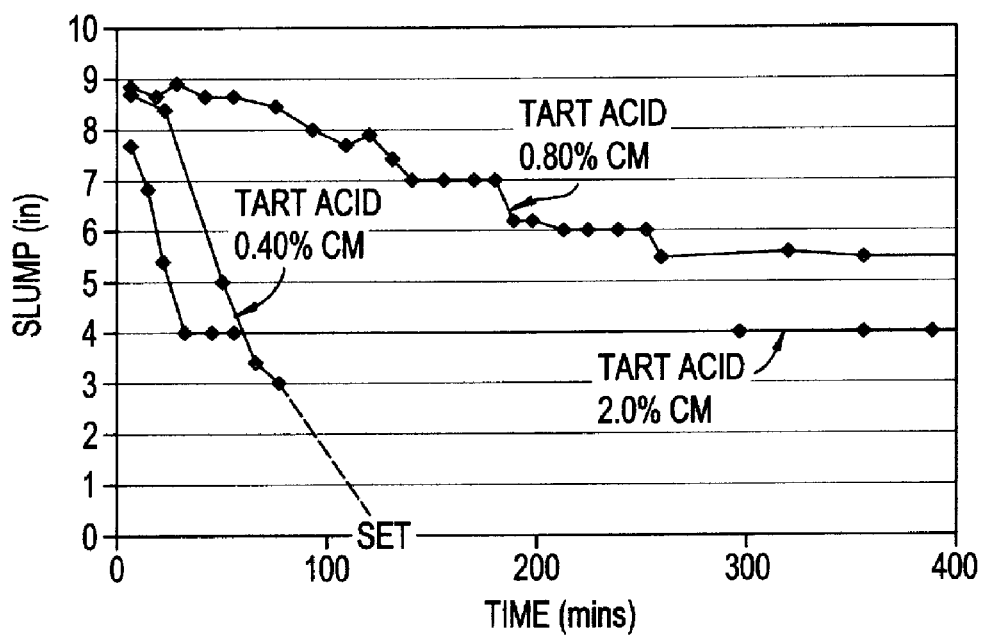
FIG. 11 is a graph of slump loss for mixes of Example 11 containing varying amounts of tartaric acid and constant amounts of superplasticizer and TEA.
Figure 12:
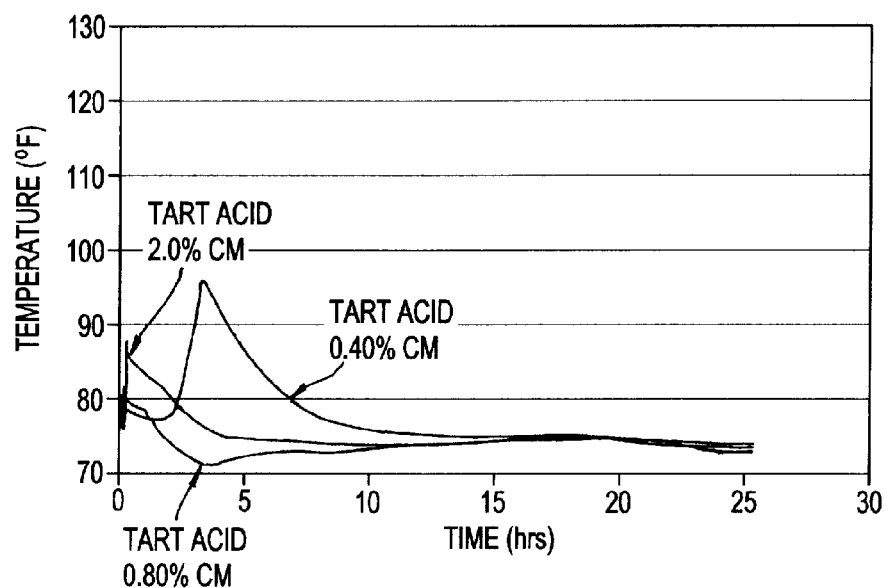
FIG. 12 is a graph of temperature rise behavior for mixes of Example 11 containing varying amounts of tartaric acid and constant amounts of superplasticizer and TEA.

FIG. 11 shows the slump loss behavior of these mixes. FIG. 12 shows the temperature rise. As shown in FIGS. 11 and 12, mixes with tartaric acid contents above 0.80% remained plastic and did not set within the first 24 hours.

Figure 13:
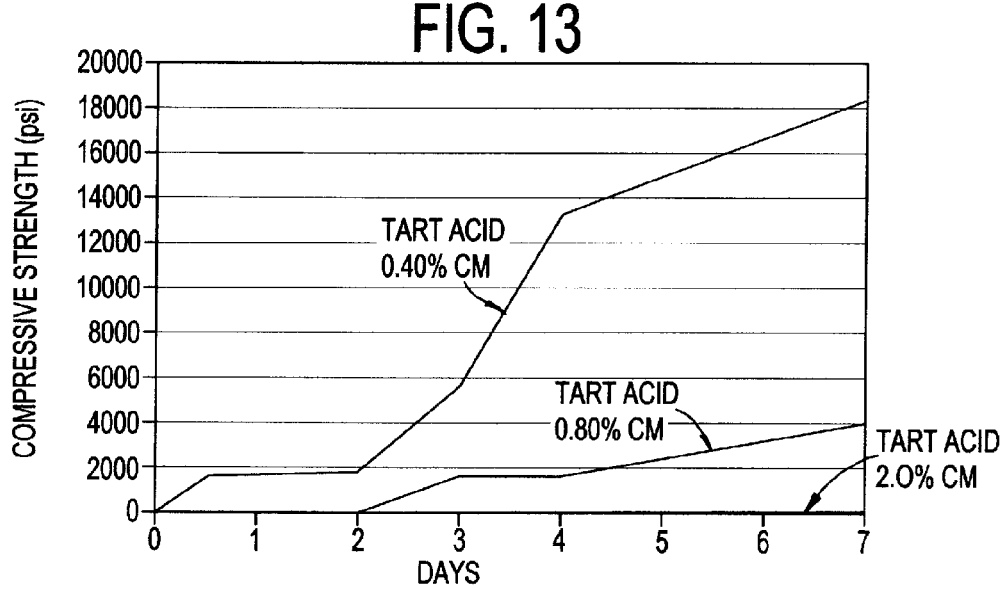
FIG. 13 is a graph of compressive strength gain for mixes of Example 11 containing varying amounts of tartaric acid and constant amounts of superplasticizer and TEA.

FIG. 13 shows the compressive strength gain of these mixes, where mixes with 0.80% and 2.0% tartaric acid had a much lower rate of strength gain. This is marginally suitable from the perspective of handling and finishing, especially in the first few hours after forming. The accelerated strength was 26478 psi, 24543 psi, and 1057 psi for the mixes with 0.40%, 0.80% and 2.0% tartaric acid, respectively. The mix with 2.0% tartaric acid does not have acceptable strength gain.

Example 12

A preferred embodiment of the armor panel of the present invention is shown in FIG. 1, with a high-density, ultra-high strength cementitious core reinforced with discrete alkali-resistant glass fibers and a thin laminate composed of continuous glass fibers embedded in a resin and adhesively bonded to both surfaces of the cementitious core with an adhesive such as polyurethane adhesive.

Half inch thick, ultra-high strength cementitious core panels reinforced with alkali-resistant glass fibers were manufacture in accordance with the above examples using a continuous process. The nominal volume fraction of the fibers in the panel was 3.0%. The manufactured panels were sanded smooth and glass fiber reinforced polymer (FRP) laminates were bonded to both cementitious surfaces using polyurethane adhesive. The panels were tested in flexure under a third-point loading test over a span of 24 inches. The panels were tested in flexural performance of the panels subjected to different conditioning regimes. The results are shown in TABLE 10.

TABLE 10

| Sample Conditioning | Sample Orientation | AMOE (ksi) | MOR (psi) | Max. Deflection (in.) |
|---|---|---|---|---|
| Dry | Face Up | 3402 | 8445 | 1.50 |
| Dry | Face Down | 3962 | 10703 | 1.44 |
| 7-Days in 200° F. Ventilation Oven + Cool to Room Temp. | Face Up | 3516 | 9780 | 2.41 |
| 7-Days in 200° F. Ventilation Oven + Cool to Room Temp. | Face Down | 3573 | 12493 | 2.69 |

As shown above in TABLE 10, the panels achieved excellent flexural strength performance exceeding 8000 psi in all cases.

Cementitious armor panels were prepared in accordance with the present invention using the formulation in TABLE 11 for testing for velocity attenuation of a projectile striking individual panels or a group of panels stacked together.

TABLE 11

| Ingredient | Weight % |
|---|---|
| Portland Cement Type 1 | 37.6 |
| Silica Fume | 6.6 |
| Silica Sand | 46.5 |
| Adva ® Cast 500 Superplasticizer | 2.2 |
| Water | 7.1 |
| AR-Glass Fibers (NEG H-103) Fraction % by Volume | 3.0 |

Figure 14:
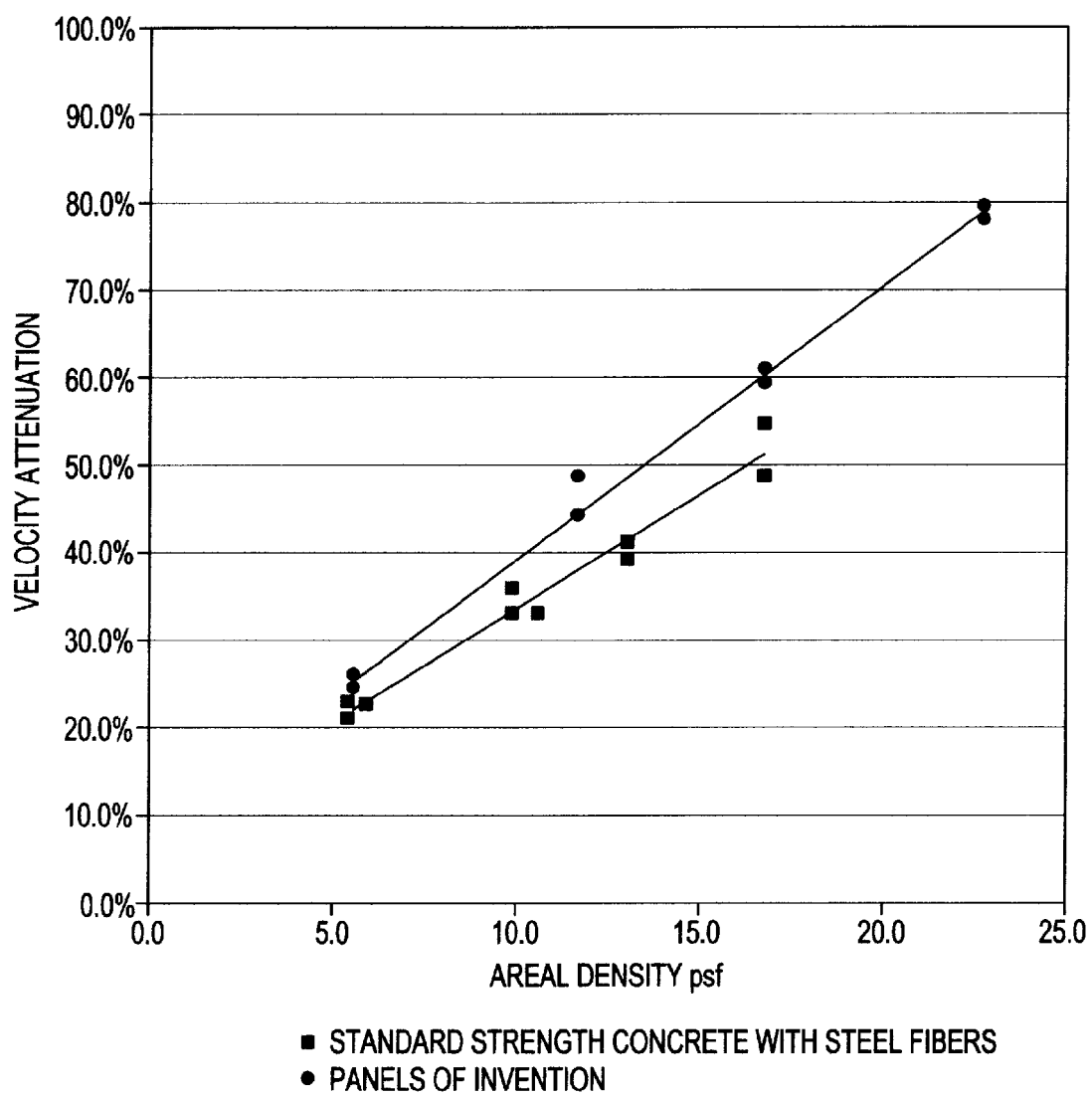
FIG. 14 is a graph of the ballistic velocity attenuation versus cementitious panel density for standard steel reinforced cementitious armor panels compared to cementitious armor panels of the invention without a FRP fiber reinforced skin layer.

FIG. 14 shows a graph of Areal density versus velocity attenuation of a standard size projectile striking an individual cementitious armor panel or a group of panels stacked together. Areal density is mass per unit of area of the tested panel. FIG. 14 represents velocity attenuation for unfaced panels of the invention (using glass reinforcement) compared to unfaced panels with steel fiber. So FIG. 14 represents a comparison of the very high density cementitious material of the invention with glass fiber to standard density cementitious material with steel fiber. As shown in the graph in FIG. 14, the armor cementitious core panels of TABLE 11 of the present invention, even without the reinforcing FRP laminate reinforcing skin on its surfaces, provided better velocity attenuation than conventional steel fiber reinforced cementitious armor panel.

Figure 15:
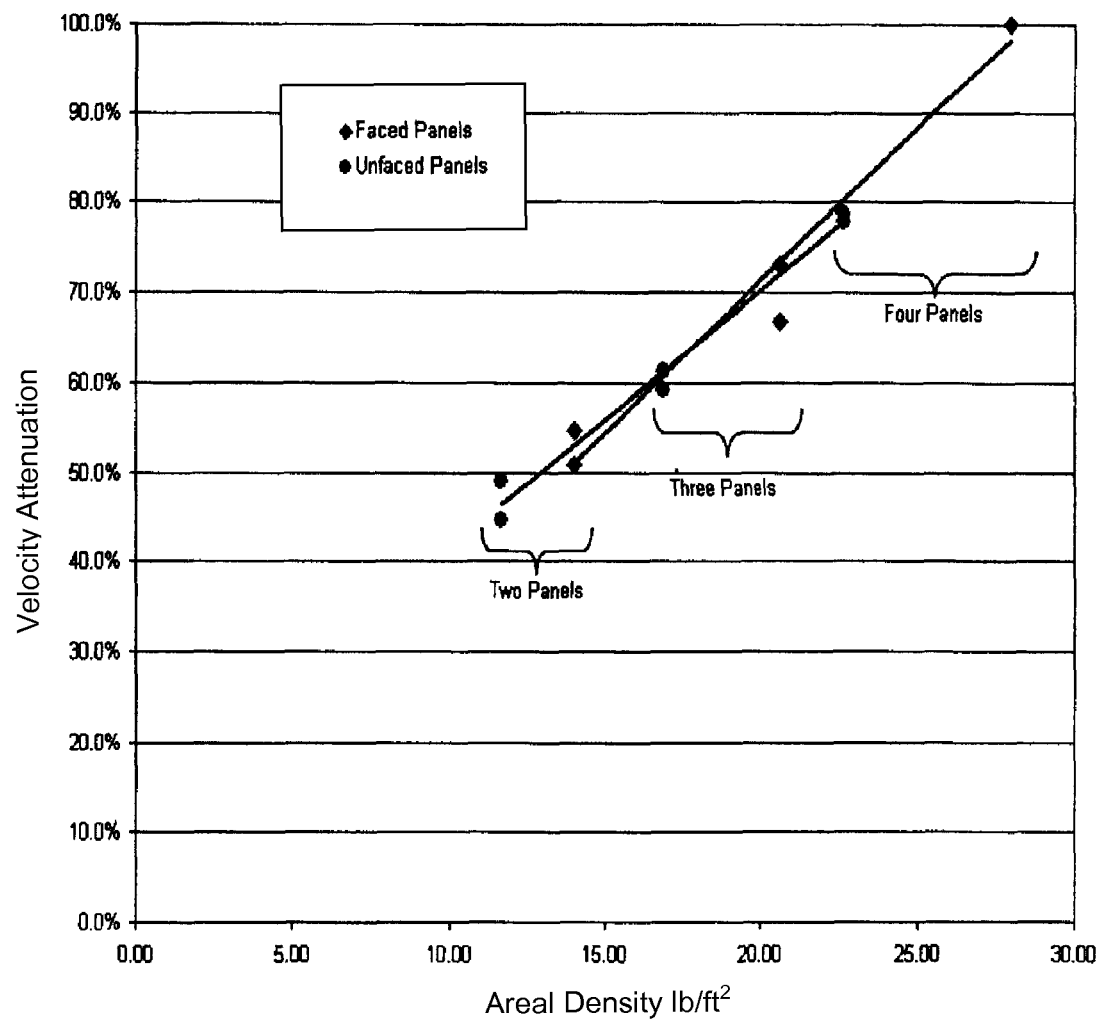
FIG. 15 is a graph of the ballistic velocity attenuation versus cementitious panel density for two, three and four panels of panels which have a laminated fiber reinforced polymer skin layer facing compared to panel without a fiber reinforced polymer skin layer facing.

FIG. 15 represents velocity attenuation for faced panels of the invention (using glass reinforcement) compared to unfaced panels of the invention (using glass reinforcement). So FIG. 15 represents a comparison using faces or not using faces with panels of the invention. The data as presented demonstrates the impact of the addition of faces on the panel with respect to velocity attenuation. The graph in FIG. 15 shows velocity attenuation of a projectile striking two, three and four cementitious armor panels of the formulation of TABLE 11 having a fiber reinforced skin layer of Kemlite ArmorTuf® woven glass fiber reinforced polyester laminate on both surface of the cementitious core panel compared to a similar number of stacked cementitious core panels having the same cementitious core structure but which do not have a fiber reinforced facing layer. This demonstrates the significant improvement in percent velocity attenuation achieved with the faced panels compared to the panels without the facing layer, particularly when multiple panels are used.

Example 13

This example highlights the relative importance between SP and tartaric acid in imparting fluidity and self-leveling behavior to the formulation. Five mixes were evaluated with cementing components and water at proportions similar to those in previous examples, and with SP and tartaric acid at the contents shown in TABLE 12:

TABLE 12

| Mix | SP (% by wt. cementing components) | Tartaric acid (% by wt. cementing components) |
|---|---|---|
| 1 | 1.7 | 0.40 |
| 2 | 0.9 | 0.40 |
| 3 | 0.0 | 0.40 |
| 4 | 0.0 | 0.80 |
| 5 | 0.0 | 2.00 |

TEA was used in all mixes at a rate of 0.045% by weight of Portland cement. The slump of these mixes is shown in FIG. 16. It is seen here that despite the enhanced fluidity offered by the addition of tartaric acid to the mixes, this additive alone is not sufficient for proper fluidity and workability of the mix. Without SP, stiff, non-flowable mixes were produced. FIG. 17 shows the slump loss for Mix 1 which behaved in a similar manner to mixes described in previous examples. Set times (initial and final) were also measured for these mixes using Gillmore needles. These results are shown in FIG. 18, where it is seen that beyond a tartaric acid content of 0.80%, setting of the mixes was significantly delayed (as also shown in the previous example).

Example 14

FIG. 19 shows a comparison of a cementitious armor panel of the present invention (no laminate) with a structural cementitious panel available from United Stages Gypsum Company and made according to US Patent Application Publication no. 2006/0174572 to Tonyan et al. (also no laminate) incorporated herein by reference. FIG. 19 represents unfaced panels of the invention (using glass reinforcement) compared to unfaced structural cementitious panels (using glass reinforcement). This is a comparison of the very high strength, high density core composition compared to a lower density core, with the lower density core that has a compressive strength in the range of 2000-3000 psi, and a density in the range of 70-80 pcf. FIG. 19 represents the impact of the high density, high strength core (with glass reinforcement) compared to a standard strength core (with glass reinforcement) on velocity attenuation.

While particular embodiments of the present invention have been shown and described, it will be appreciated by those skilled in the art that changes and modifications may be made thereto without departing from the invention in its broader aspects and as set forth in the following claims.

We claim:

1. A cementitious armor panel system comprising:
   a frame;
   a blast resistant cementitious panel supported on the frame, the blast resistant cementitious armor panel comprising:
   a reinforcing fiber uniformly distributed within a cementitious core comprising a continuous phase resulting from the curing of a self-leveling aqueous mixture of 25-45 weight % inorganic cement binder,
   an absence of silica flour,
   35-65 weight % sand filler having a median particle size of 150-450 microns,
   5-15 weight % pozzolanic filler having a median particle size of less than or equal to 50 microns,
   0.25-5.0 weight % polycarboxylate based self-leveling agent, and
   6-12 weight % water, wherein the weight ratio of water to the combined weight of the inorganic cement binder and pozzolanic filler dry reactive powders is less than or equal to 0.35:1.0, and
   a skin-layer attached to at least one surface of the cured continuous phase.

2. The panel of claim 1, wherein the cementitious core comprises the reinforcing fiber in an amount of 0.5-6.0% by volume of the cementitious core, the sand filler having a median particle size of 200-350 microns, and having a compressive strength of at least 10,000 psi.

3. The system of claim 1, wherein the cementitious panel has a compressive strength of more than 25,000 psi when cured.

4. The system of claim 1, wherein the skin-layer is a fiberglass reinforced plastic.

5. The system of claim 1, wherein the compressive strength after 1 day curing is less than 2000 psi and the compressive strength develops to more than 20,000 psi after curing for 28 days.

6. The system of claim 1, wherein the weight ratio of pozzolanic filler to inorganic cement binder is 0.05 to 0.30:1.0.

7. The system of claim 1, wherein the weight ratio of sand filler to the combined weight of inorganic cement binder and pozzolanic filler is 0.75 to about 1.50:1.0.

8. The system of claim 1, wherein the weight ratio of water to the combined weight of the inorganic cement binder and pozzolanic filler dry reactive powders is less than or equal to 0.20:1.0.

9. The system of claim 1, wherein the pozzolanic filler is silica fume.

10. The system of claim 1, wherein the continuous phase comprises 0.75-2.5 weight % polycarboxylate polyether self-leveling agent.

11. The system of claim 1, wherein the skin-layer is mechanically fastened to the cementitious core.

12. The system of claim 1, wherein the frame is a metal frame and has a channel for receiving the cementitious panels in a laid in structure on at least one surface of the metal frame and clips are attached to the frame having the channel for receiving the cementitious panels in the laid in structure on at least one surface of the metal frame.

13. The system of claim 1, wherein the cementitious panels have pre-drilled holes for use with mechanical fasteners for attaching the panels to the frame structure.

14. The system of claim 4, wherein the cementitious panels are adhesively attached to the frame structure.

15. The system of claim 1, comprising said frame, a first said panel on one side of the frame, a second said panel on an opposed side of the frame, and an infill material in a cavity in the frame formed between the first and second panels.

16. The system of claim 15, wherein the infill material is selected from the group consisting of concrete, sand, cellular concrete, and light weight aggregate.

17. The system of claim 1, wherein there is more than one frame structure and the cementitious panels are attached to opposed sides of the frame structures.

18. The system of claim 1, wherein the frame structure is in the form of metal studs arranged in the form of a wall structure and the cementitious armor panels are attached to at least one side of the frame structure to form a wall.

19. The system of claim 1, wherein the assembly is comprised of frames formed in the shape of an easel with cross supports joining the frame structures and the panel is laid into channels formed by clips which are attached to the frame.

20. A cementitious armor panel system comprising:
a frame;
a blast resistant cementitious panel supported on the frame, the panel comprising:
a cementitious core comprising
a continuous phase resulting from the curing of a self-leveling aqueous mixture of 25-45 weight % inorganic cement binder,
an absence of silica flour, 35-65 weight % sand filler having a median particle size of 250-350 microns,
5-15 weight % pozzolanic filler having a median particle size of less than or equal to 0.1 microns,
1.0-1.25 weight % polycarboxylate based self-leveling agent,
triethanolamine in an amount of 0.025 wt. % to 0.075 wt. % by weight of the cement binder,
tartaric acid in an amount of 0.40 wt. % to 0.60 wt. % by weight of the combined weight of the cement binder and pozzolanic filler, and
6-12 weight % water, wherein the weight ratio of water to the combined weight of the inorganic cement binder and pozzolanic filler dry reactive powders is less than or equal to 0.25:1.0,
reinforcing glass fiber in an amount of 3.0-3.5% by volume of the cementitious core uniformly distributed within the continuous phase before the continuous phase is cured, and
a fiber glass reinforced plastic skin layer attached to at least one surface of the cured continuous phase.

* * * * *